US012553558B2

(12) United States Patent
Wu et al.

(10) Patent No.: US 12,553,558 B2
(45) Date of Patent: Feb. 17, 2026

(54) CONNECTOR COMPONENT AND CONNECTOR SYSTEM

(71) Applicant: Agency for Science, Technology and Research, Singapore (SG)

(72) Inventors: Ying Ying Wu, Singapore (SG); Jia Sheng Zach Lee, Singapore (SG); Ahmad Amirul Bin Abdul Rahim, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 64 days.

(21) Appl. No.: 18/685,465

(22) PCT Filed: Aug. 18, 2022

(86) PCT No.: PCT/SG2022/050587
§ 371 (c)(1),
(2) Date: Feb. 21, 2024

(87) PCT Pub. No.: WO2023/027633
PCT Pub. Date: Mar. 2, 2023

(65) Prior Publication Data
US 2025/0122964 A1  Apr. 17, 2025

(30) Foreign Application Priority Data
Aug. 26, 2021 (SG) .............................. 10202109365S

(51) Int. Cl.
*F16L 37/44* (2006.01)
(52) U.S. Cl.
CPC .................................. *F16L 37/44* (2013.01)
(58) Field of Classification Search
CPC . F16L 37/30; F16L 37/32; F16L 37/36; F16L 37/38; F16L 37/40; F16L 37/44;
(Continued)

(56) References Cited
U.S. PATENT DOCUMENTS

| 4,436,125 A | 3/1984 | Blenkush |
| 4,828,557 A | 5/1989 | Persidsky |

(Continued)

FOREIGN PATENT DOCUMENTS

| AU | 2011211445 A1 | 9/2011 |
| CA | 1075649 A | 4/1980 |

(Continued)

OTHER PUBLICATIONS

International Search Report for International Application No. PCT/SG2022/050587 dated Apr. 5, 2023, pp. 1-4.

(Continued)

*Primary Examiner* — Hailey K. Do
(74) *Attorney, Agent, or Firm* — Shackelford, McKinley & Norton, LLP

(57) ABSTRACT

A connector system having a pair of connector components capable of being used as a reuseable aseptic connection in bioprocessing and/or cell manufacturing processes. Each connector component includes a connector housing having a mating surface with an opening and a door moveable to close and open the opening, and a connector assembly therein. The connector assembly includes a base member having a fluid port; an engagement piece having a pusher portion; and a valve unit therebetween, the valve unit having a resilient deformable valve member. The pusher portion is moveable to cause the pusher portion to urge open the resilient deformable valve member for enabling the fluid flow. When the pair of connector components are interlocked, the doors open and the connector assemblies move and engage with each other through the openings causing the resilient deformable valve members to open for establishing a fluid connection.

20 Claims, 8 Drawing Sheets

(58) Field of Classification Search
CPC ......... F16L 2201/44; A61M 2039/262; A61M 2039/267
See application file for complete search history.

(56) References Cited

U.S. PATENT DOCUMENTS

| | | | | |
|---|---|---|---|---|
| 5,269,771 | A | * | 12/1993 | Thomas ................. A61M 39/26 604/167.04 |
| 5,492,147 | A | * | 2/1996 | Challender ............. F16L 37/28 604/905 |
| 5,858,016 | A | | 1/1999 | Bacehowski et al. |
| 6,077,259 | A | | 6/2000 | Caizza et al. |
| 6,679,529 | B2 | | 1/2004 | Johnson et al. |
| 6,808,161 | B1 | | 10/2004 | Hishikawa |
| 7,137,974 | B2 | | 11/2006 | Almasian et al. |
| 7,762,524 | B2 | * | 7/2010 | Cawthon ............. A61M 39/165 604/533 |
| 8,029,023 | B2 | | 10/2011 | Arthun et al. |
| 8,671,964 | B2 | | 3/2014 | Py |
| 9,482,351 | B2 | | 11/2016 | Proulx et al. |
| 9,675,520 | B2 | | 6/2017 | Rogers et al. |
| 9,901,729 | B2 | | 2/2018 | Vigna et al. |
| 10,267,443 | B2 | | 4/2019 | Blake et al. |
| 2010/0292673 | A1 | | 11/2010 | Korogi et al. |
| 2013/0035668 | A1 | | 2/2013 | Kitani et al. |
| 2015/0122369 | A1 | | 5/2015 | Py |
| 2016/0022979 | A1 | | 1/2016 | Vigna et al. |
| 2017/0143953 | A1 | | 5/2017 | Williams et al. |
| 2018/0326199 | A1 | | 11/2018 | Ueda et al. |

FOREIGN PATENT DOCUMENTS

| | | |
|---|---|---|
| EP | 2937616 B1 | 6/2018 |
| WO | 2009052433 A2 | 4/2009 |

OTHER PUBLICATIONS

Written Opinion of the International Searching Authority for International Application No. PCT/SG2022/050587 dated Apr. 5, 2023, pp. 1-5.

Extended European Search Report for European Patent Application No. 22861805.4 dated Mar. 5, 2025, pp. 1-9.

* cited by examiner

CONNECTOR COMPONENT AND CONNECTOR SYSTEM

CROSS REFERENCES TO RELATED APPLICATIONS

The present application claims the benefit of the Singapore patent application Ser. No. 10202109365S filed on 26 Aug. 2021, the entire contents of which are incorporated herein by reference for all purposes.

TECHNICAL FIELD

Various embodiments generally relate to a connector component, and a connector system. In particular, various embodiments generally relate to a connector system having a pair of connector components capable of being used as a reuseable aseptic connection in bioprocessing and/or cell manufacturing processes.

BACKGROUND

Conventional sterile fluid connectors are generally for one-time use. Such connectors generally require manifold assemblies to have many connecting points and several handling steps to operate. For bioprocessing and cell manufacturing processes that involve multiple input/output steps, tube welding, tube manifold assembly and/or single-use sterile connectors are generally used as sterile fluid connections.

Tube welding generally refers to welding cut ends of two tubes so as to connect the two tubes. To stop a flow within a connected tube, tube sealing can also be done by melting and fusing the tube across its lumen. While ad-hoc aseptic connection and removal of tubes may be achieved, tube welding is limited to a few tubing materials. Further, the tubes to be connected must also be of the same size and material. In addition, the tube length is reduced each time a tube welding is made. Operating of the tube welder also requires specialised training and learning of the handling steps because the quality of weld is operator-dependent. Such welder machine is also usually deployed in a cleanroom environment.

Tubing manifold assembly generally refers to configurations of disposable containers, connection devices, tubing and other equipment, pre-assembled and sealed together. These input and output connections are set specifically to a predetermined protocol. Thus, changes to the protocol may require changing the entire manifold configuration, and re-validation of the process. Disconnection or addition of the manifold components may also require tube welding and sealing.

Single-use sterile disposable connectors are usually attached to the ends of tubing. Such single-use disposable connector generally contains an aseptic barrier that is broken when two complimentary connectors are connected and engaged to establish fluid flow. These can typically be used in straightforward fluid handling procedures or integrated into manifold assemblies. When the manifold assembly is configured to include such single-use sterile disposable connectors, the manifold assembly usually has extensive branches which are hard to manage and costly to manufacture. For cell manufacturing, a pre-set number of single-use sterile disposable connectors can be integrated into a manifold assembly to satisfy the number of connections needed in the cell-processing protocols. Once a connection is made, the single-use sterile disposable connector is exhausted. Subsequently, the connection made may be removed from the manifold assembly by tube sealing.

Accordingly, there is a need for a more effective and versatile connector and/or connector system, in particular for use in bioprocessing and/or cell manufacturing processes.

SUMMARY

According to various embodiments, there is provided a connector system. The connector system including a pair of first and second connector components. Each of the pair of first and second connector components including a connector housing having a mating surface, which has an opening, and a door moveable relative to the mating surface between a closed position to close the opening and an opened position to open the opening. Each of the pair of first and second connector components including a connector assembly enclosed within the connector housing and moveable relative to the connector housing towards or away from the opening at the mating surface of the connector housing along a translation axis. The connector assembly including a base member having a fluid port. The connector assembly including an engagement piece having a contact portion directed towards the opening at the mating surface of the connector housing and a pusher portion, wherein a fluid channel extends through the engagement piece via the contact portion and the pusher portion. The connector assembly including a valve unit disposed between the base member and the engagement piece, the valve unit having a resilient deformable valve member operable to control fluid flow through the valve unit between the fluid port of the base member and the fluid channel of the engagement piece. The engagement piece is fitted to the valve unit with the pusher portion in abutment with the resilient deformable valve member of the valve unit and moveable relative to the base member in a manner so as to cause the pusher portion to urge open the resilient deformable valve member for enabling the fluid flow therethrough as the engagement piece is moved towards the base member under an application of a force and to cause the resilient deformable valve member to move the engagement piece away from the base member as the resilient deformable valve member returns to its original state to close the resilient deformable valve member for ceasing the fluid flow therethrough when the force is removed. The pair of first and second connector components are removably interlockable to each other with the mating surfaces thereof directed towards each other and with the openings at the mating surfaces aligned. When the pair of first and second connector components are interlocked and the doors of the connector housings thereof are in the opened position, the connector assemblies of the pair of first and second connector components are respectively moveable towards the openings of the mating surfaces of the pair of first and second connector components in a manner so as to be engageable with each other through the openings at the mating surfaces to cause the engagement pieces of the pair of first and second connector components to urge against each other such that the engagement pieces of the pair of first and second connector components are respectively moved towards the base members thereof to urge open the resilient deformable valve members of the valve units thereof so as to establish a fluid connection through the connector assemblies of the pair of first and second connector components between the fluid ports of the base members of the pair of first and second connector components.

According to various embodiments, there is provided a connector component. The connector component including a connector housing having a mating surface, which has an opening, and a door moveable relative to the mating surface between a closed position to close the opening and an opened position to open the opening. The connector component including a connector assembly enclosed within the connector housing and moveable relative to the connector housing towards or away from the opening at the mating surface of the connector housing along a translation axis. The connector assembly including a base member having a fluid port. The connector assembly including an engagement piece having a contact portion directed towards the opening at the mating surface of the connector housing and a pusher portion, wherein a fluid channel extends through the engagement piece via the contact portion and the pusher portion. The connector assembly including a valve unit disposed between the base member and the engagement piece, the valve unit having a resilient deformable valve member operable to control fluid flow through the valve unit between the fluid port of the base member and the fluid channel of the engagement piece. The engagement piece is fitted to the valve unit with the pusher portion in abutment with the resilient deformable valve member of the valve unit and moveable relative to the base member in a manner so as to cause the pusher portion to urge open the resilient deformable valve member for enabling the fluid flow therethrough as the engagement piece is moved towards the base member under an application of a force and to cause the resilient deformable valve member to move the engagement piece away from the base member as the resilient deformable valve member returns to its original state to close the resilient deformable valve member for ceasing the fluid flow therethrough when the force is removed.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
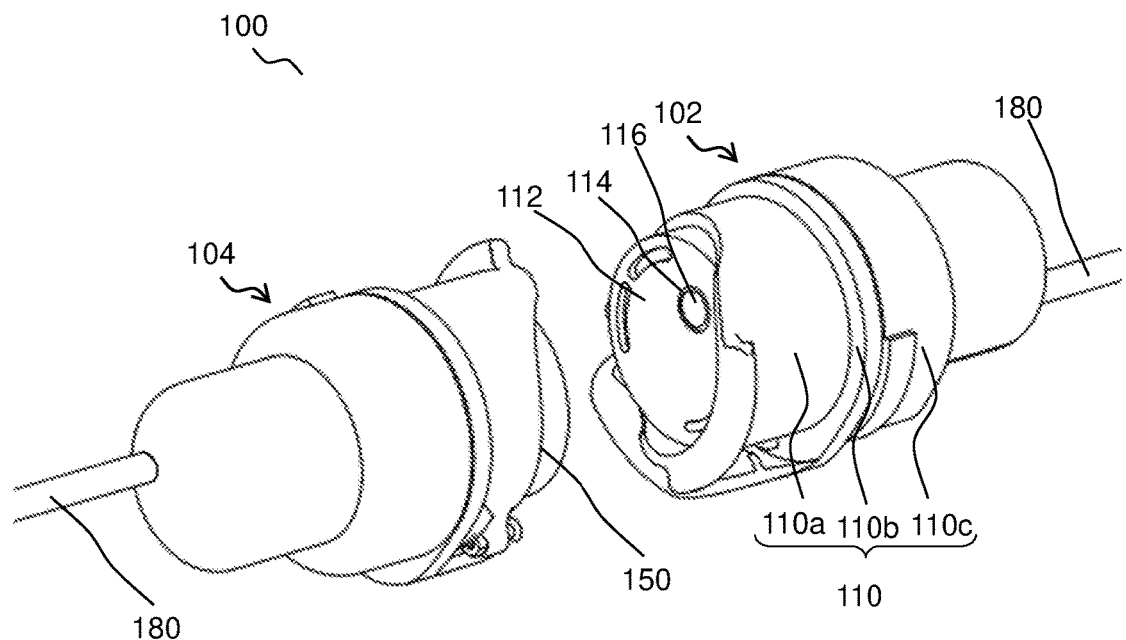
FIG. 1A shows a disconnected view of a connector system having a pair of first and second connector components according to various embodiments.

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a connector component (or connector), and a connector system. In particular, various embodiments generally relate to a connector system having a pair of connector components capable of being used as a reuseable aseptic connection in bioprocessing and/or cell manufacturing processes. In various embodiments, the connector component refers to a component for connecting to another component to establish a connection therebetween. Hence, the connector component may be one part of the connection. Further, at least two connector components may be connected together to form the connection. Thus, according to various embodiments, the connector system may include a pair of connector components connectable or connected to each other for establishing the connection therebetween. Accordingly, each of the pair of connector components may be a part of the connection and/or the connector system. According to various embodiments, the connector component and the connector system may be reuseable. Accordingly, the connector component and the connector system may be used more than once. According to various embodiments, the connection formed is an aseptic connection. Accordingly, the connection formed may be free of contamination (e.g. free of living organisms such as bacteria, viruses, or other harmful living organisms). Hence, sterility may be maintained in the connection formed.

Various embodiments seek to provide a compact aseptic connector that enables repeated aseptic connections to be made with the same connector. For example, various embodiments may be capable of being used for two or three or four or five or six or more connection and disconnection cycles. An example embodiment may be capable of being used up to six connection and disconnection cycles. Various embodiments also seek to support the aseptic transfer of small volumes through tubing with small diameter. For example, the tubing may have an internal diameter of between 1 mm to 5 mm, or between 2 mm to 5 mm, or approximately 3.175 mm (or 0.125 inch).

Various embodiments seek to provide a multiple-use aseptic connector that is genderless for enabling fuss-free management of tubing. Various embodiments may be easy to use. Various embodiments may be configured establish a re-sealable aseptic connection via a three-step connection process (for example see FIG. 1A to FIG. 1D). Step 1 may include pushing the two connector components (or connectors) towards each other. Step 2 may include rotating and locking respective rotators of respective connector components to each other. Step 3 may include continuing rotation until hitting a stop.

Various embodiments seek to provide multiple fail-safe mechanisms built into the connector component to prevent or avoid or eliminate accidental exposure of the aseptic environment to the external environment. Hence, according to various embodiments, there may be no accidental disconnection during operation, and no drip of liquid during connection (i.e. drip-free connection). For example, the connector component may include at least two fail-safe mechanism to enable robust and reliable connection.

According to various embodiments, the connector component (e.g. the multiple-use aseptic connector) may be capable of aseptic operation, and/or small volume transfer of liquid, and/or multiple uses (e.g. up to 6 reconnections).

According to various embodiments, the aseptic operation for the connector component may refer to the prevention of contamination during liquid transfer from one connector component to the other connector component. This may be done in a room environment without additional isolation or decontamination equipment or techniques, i.e. aseptic connection does not require biological safety cabinet (BSC) or alcohol swabbing.

According to various embodiments, the connector component may include a two-barrier system that isolates surfaces in contact with the liquid from surfaces and the external environment which may be exposed to potential contaminations. Each barrier may enclose an independent environment that may be sterilised during its manufacture. These environments may be mutually exclusive and may never be exposed to the external room environment. For example, see FIG. 2A to FIG. 2C.

Figure 2A:
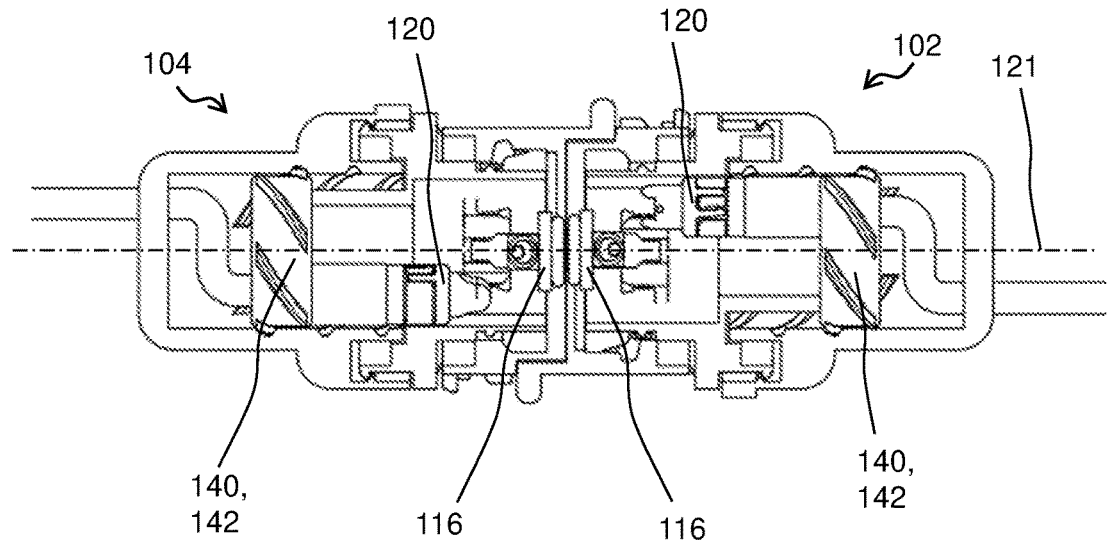
FIG. 2A to FIG. 2C show longitudinal section views of the connector system of FIG. 1A illustrating the sequence of connecting the pair of first and second connector components together corresponding to the sequence of FIG. 1B to FIG. 1D, according to various embodiments.

According to various embodiments, the first environment may be an empty space within the connector component (for example, see FIG. 2A). The first environment of the connector component may only open to a corresponding first environment of the other connector component when a door moves away from an opening, which happens after the first step of the connection process. A first barrier in the form of a housing together with the door may enclose the first environment. According to various embodiments, the connector component may include an alignment element for aligning the opening during the first step of the connection process.

According to various embodiments, the only surface that may be exposed to the external environment which enters the first environment may be an outermost surface of the door. To limit the potential for contamination through exposure to this surface, the door may be moved away from the liquid path. According to various embodiments, the movement of the door follows a curved path (for example, see FIG. 2A to FIG. 2C), thereby preventing the outermost surface from touching any other internal surfaces of the first environment. In addition, the outermost surface of the door may always be oriented away from other internal elements of the first environment to further reduce the chances of contamination (for example see FIG. 2B).

According to various embodiments, a second barrier may enclose a second environment, which may be a liquid path from a tubing to an inner connector assembly (or inner connector). An opening to the second environment may be gated by valve unit (e.g. a bite valve) of the inner connector assembly. The valve unit (e.g. the bite valve) may open only when the inner connector assemblies (or the inner connectors) of both connector components are fully extended and depressed by their counterparts (For example, see FIG. 2C). The inner connector assembly may be a three-piece assembly which self-aligns with its counterpart. When pushed against each other, a pusher portion (e.g. a protrusion) at a back of an engagement piece (or an outermost piece) then elastically deforms and opens the valve unit (or the bite valve), thus fluidically connecting the second environments of the inner connector assemblies of both connector components. For example, see FIG. 3A and FIG. 3B for the inner connector assembly.

According to various embodiments, the inner connector assembly (or inner connector) may also act or serve as a barrier separating the first and second environments, preventing any contaminants in the first environment from entering the second environment.

Upon disconnection, the valve unit (or the bite valve) may recover to its original shape and may push out the engagement piece (or the outermost piece). This may close the connection in a drip-free manner, separating the first and second environments once again.

According to various embodiments, the two-barrier system may operate in a sequential manner to prevent the second environment from direct exposure to the external environment. The second barrier may only open when the door is removed from the opening of the connector component. Conversely, the door may not return to the opening of the connector component until the inner connector assembly is fully retracted. This sequential movement may be strictly enforced by an anti-rotation mechanism (e.g. a T-pin) that restrict the relative movements or rotations of different parts of the connector component. More specifically, the anti-rotation mechanism (e.g. the T-pin) may restrict a first part (e.g. a first rotator) and a second part (e.g. a second rotator), which in turn may control the door and the inner connector assembly respectively. For example, see FIG. 7A and FIG. 7B.

According to various embodiments, the small volume transfer of the connector component may also be controlled by the valve unit (e.g. bite valve) in the inner connector assembly. Various embodiments may be capable of achieving smaller volume transfer as compared to conventional connection devices because various embodiments use the valve unit (e.g. bite valve) made of rubber that may contract and expand to gate the opening of the fluid path which differs from the springs or mechanical gates in the conventional connection devices. The deformation of the rubber in the various embodiments may be controlled by a small casing. Further, the inner connector assembly of the connector component may be configured to be genderless and capable of self-alignment which again differs from the common female and male terminal configuration of the conventional connection devices. For example, in light of the above, the inner connector assembly may have an overall diameter of between 6 mm to 10 mm, or 7 mm to 9 mm, or approximately 8 mm.

According to various embodiments, multiple reconnections of the connector component may be achievable because the connector component may not consume or irreversibly modify any elements. This is in contrast to conventional single-use connectors which typically utilised membranes and needles that are either removed or destroyed during the connection step.

According to various embodiments, there is provided a connector component (e.g. a multiple-use aseptic connector) capable of aseptic reconnection, for example up to 6 times, which may be facilitated by the two-barrier system that operates in a successive manner. The connector component may include the two isolated environments, where one is enclosed within another, to prevent the exposure of the innermost environment to the external environment (e.g. outside the connector component) and vice versa, and where the first barrier may include the door that follows a curved path and the second barrier may include the valve unit (e.g. bite valve) to enable leak-free connection. The connector component may include two fail-safe mechanisms for robust maintenance of the aseptic environment within the connector component. The connector component may be capable of small volume transfer of liquid using the valve unit (e.g. a modified bite valve) that may be genderless and configured for self-alignment.

Figure 1B:
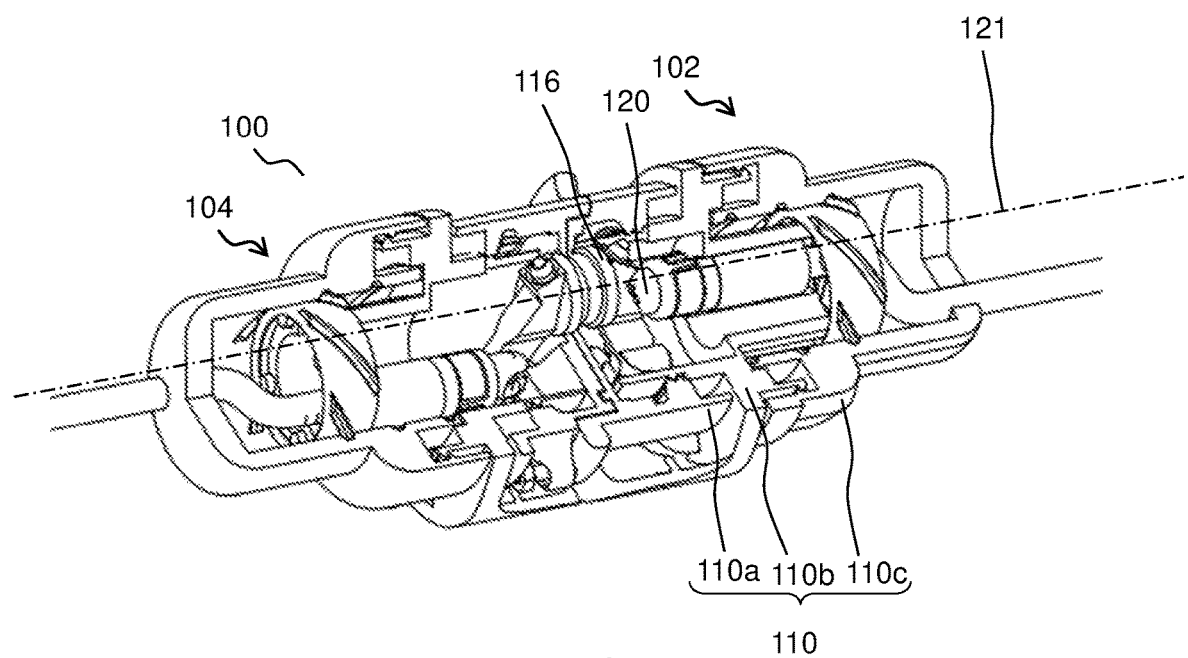
FIG. 1B to FIG. 1D show partial cut away views of the connector system of FIG. 1A illustrating a sequence of connecting the pair of first and second connector components together according to various embodiments.
Figure 1C:
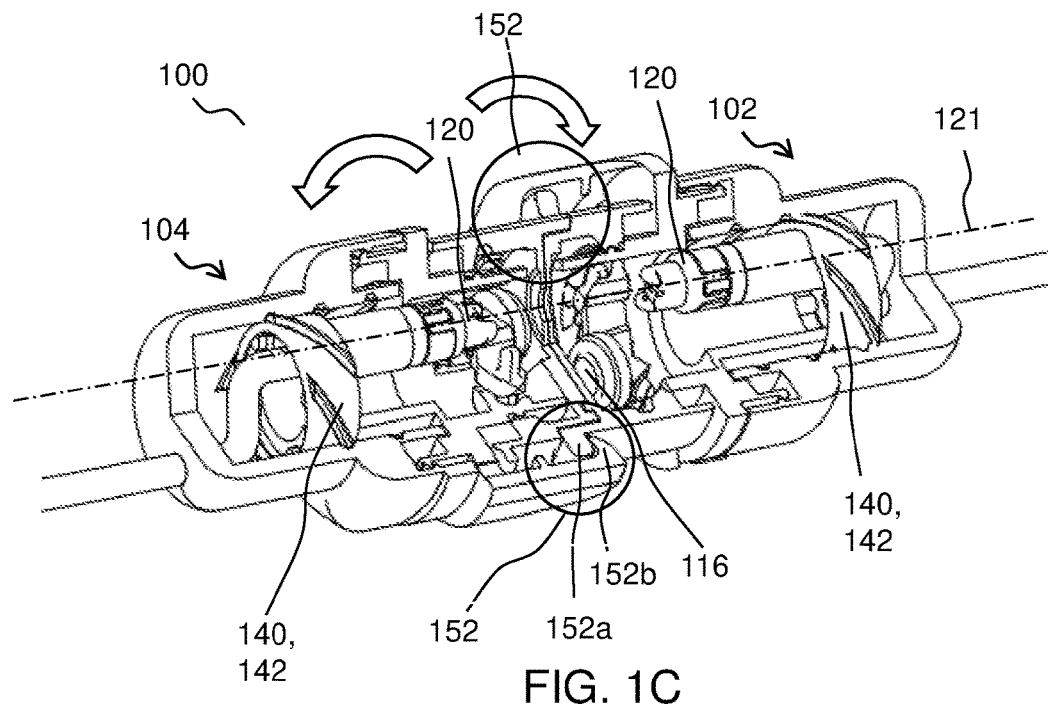
Figure 1D:
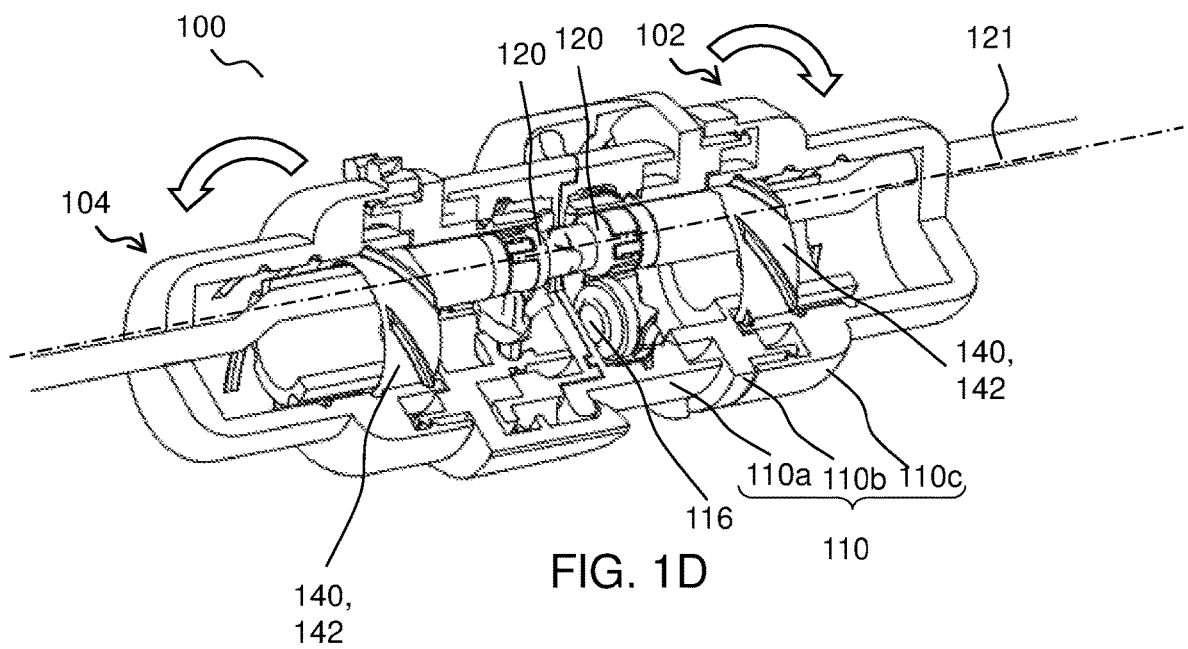
Figure 2B:
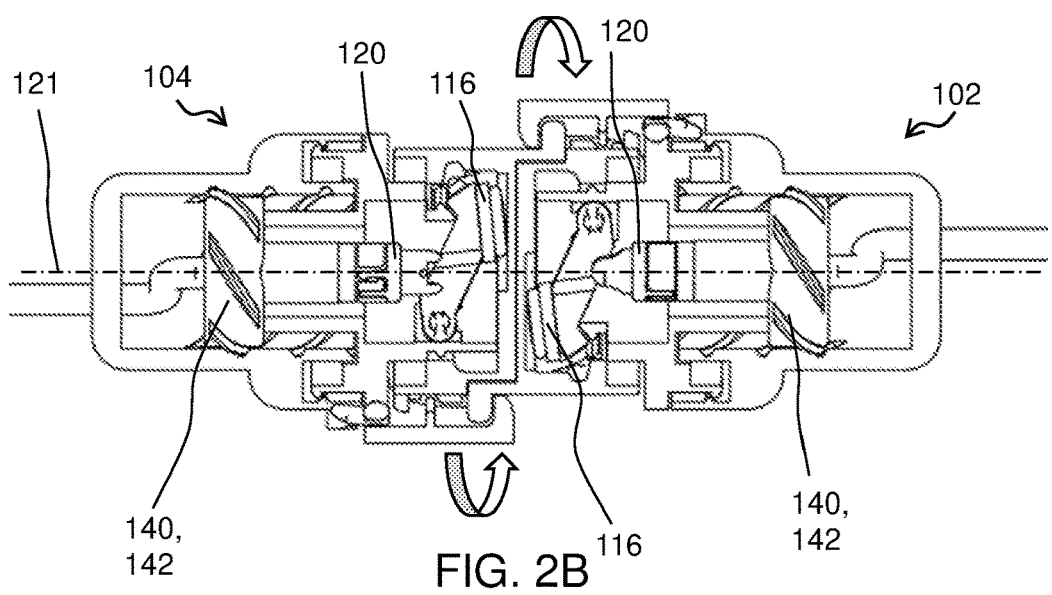
Figure 2C:
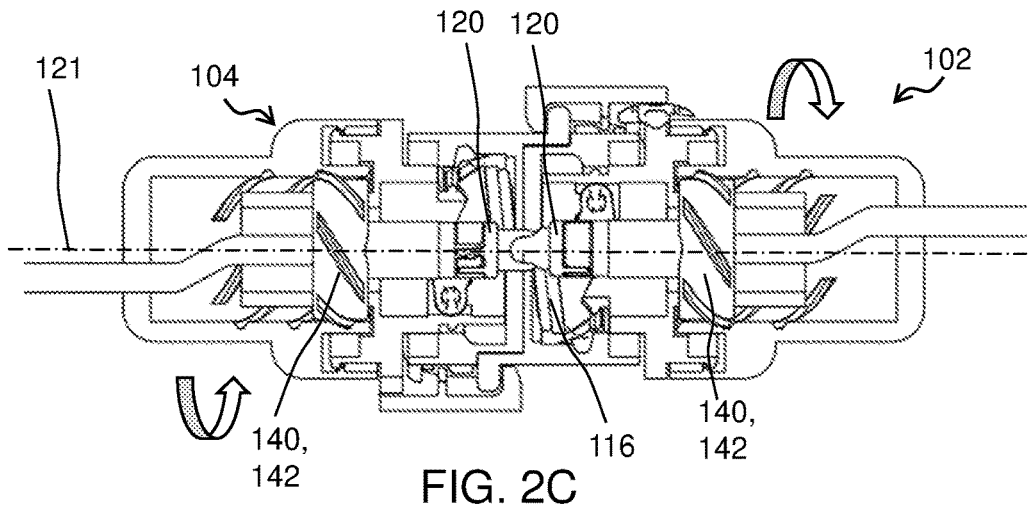
Figure 3:
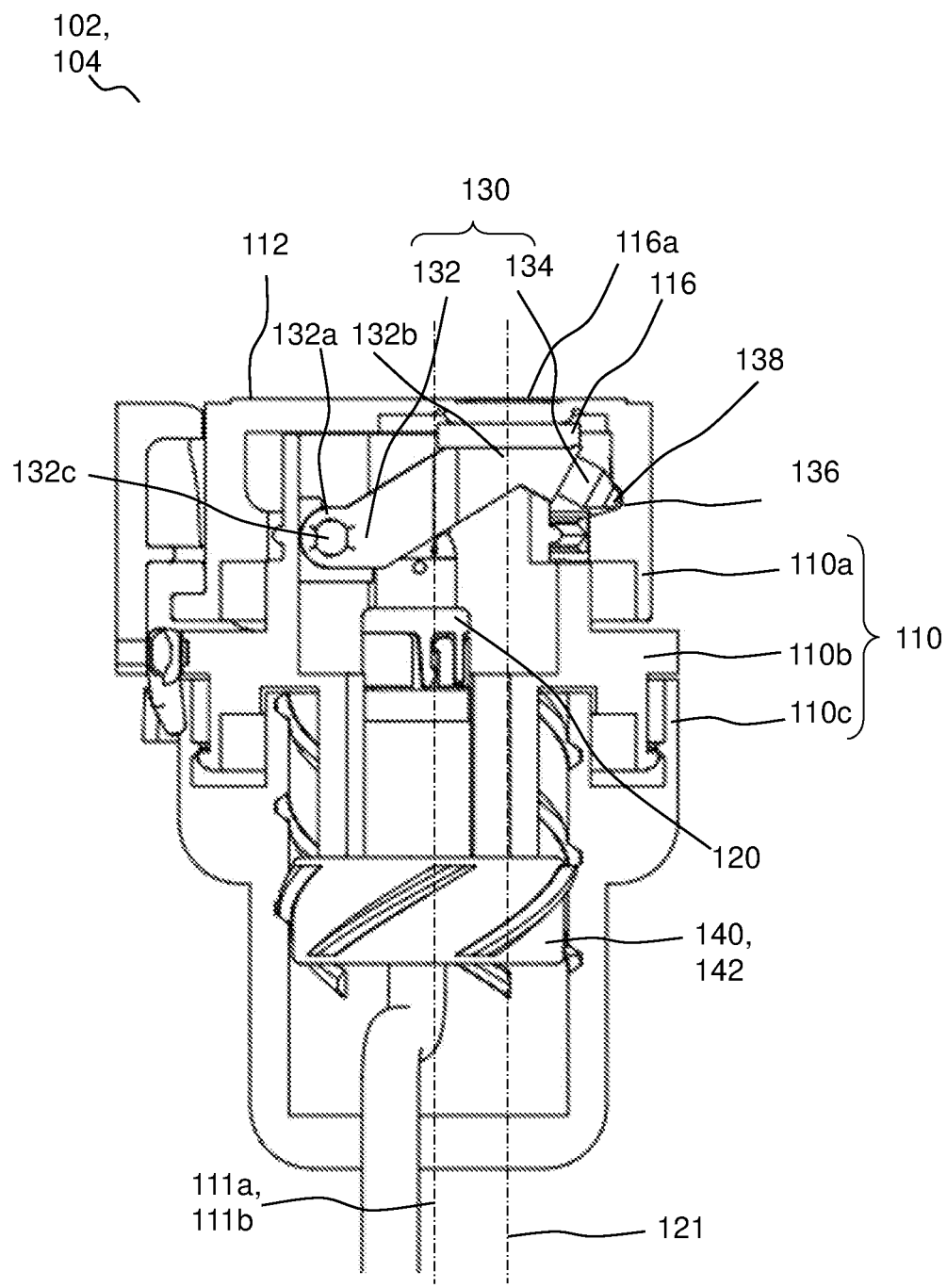
FIG. 3 shows a longitudinal section view of each of the pair of first and second connector components according to various embodiments.

FIG. 1A shows a disassembled view of a connector system 100 having a pair of first and second connector components 102, 104 according to various embodiments. FIG. 1B to FIG. 1D show partial cut away views of the connector system 100 of FIG. 1A illustrating a sequence of connecting the pair of first and second connector components 102, 104 together according to various embodiments. FIG. 2A to FIG. 2C show longitudinal section views of the connector system 100 of FIG. 1A illustrating the sequence of connecting the pair of first and second connector components 102, 104 together corresponding to the sequence of FIG. 1B to FIG.1D, according to various embodiments. FIG. 3 shows a longitudinal section view of each of the first and second connector components 102, 104 according to various embodiments.

According to various embodiments, the connector system 100 may be reuseable and the connection formed may be an aseptic connection. Accordingly, each of the pair of first and second connector components 102, 104 may be a multiple-use aseptic connector.

According to various embodiments, each of the pair of first and second connector components 102, 104 may include a connector housing 110. The connector housing 110 may enclose a space to serve as a first environment which may be isolated from an external environment outside the respective connector component 102, 104. Accordingly, the connector housing 110 may act as a barrier between the external environment outside the connector housing 110 and the first environment inside the connector housing 110 so as to segregate or set apart the first environment and the external environment.

According to various embodiments, the connector housing 110 of each of the pair of first and second connector components 102, 104 may include a mating surface 112. The mating surfaces 112 of the connector housings 110 of the pair of first and second connector components 102, 104 may be respectively directed towards and/or abutting each other when the first connector component 102 and the second connector component 104 are connected to each other. Hence, the mating surfaces 112 of the connector housings 110 of the pair of first and second connector components 102, 104 may be matching and may be oriented flat towards or against each other when the first connector component 102 and the second connector component 104 are connected to each other.

According to various embodiments, the mating surface 112 of the connector housing 110 of each of the pair of first and second connector components 102, 104 may include an opening 114. The opening 114 may be a hole in the mating surface 112 serving as a break or a gap through the mating surface 112. According to various embodiments, the connector housing 110 of each of the pair of first and second connector components 102, 104 may include a door 116 moveable relative to the mating surface 112 between a closed position to close the opening 114 and an opened position to open the opening 114. When the door 116 is in the closed position, the connector housing 110 may be fully sealed such that the space (or the first environment) within the connector housing 110 is fully isolated from the external environment. When the door 116 is in the opened position, the door 116 may be moved away from the opening 114 of the mating surface 112 such that the opening 114 of the mating surface 112 may be unobstructed or unblocked or clear.

According to various embodiments, each of the pair of first and second connector components 102, 104 may include a connector assembly 120 (or an inner connector assembly). The connector assembly 120 may be enclosed within the connector housing 110. Accordingly, the connector assembly 120 may be inside the connector housing 110 or disposed in the first environment enclosed by the connector housing 110. Hence, the connector housing 110 may surround the connector assembly 120 or the connector assembly 120 may be contained or held in the connector housing 110.

According to various embodiments, the connector assembly 120 may be moveable relative to the connector housing 110 towards or away from the opening 114 at the mating surface 112 of the connector housing 110. Accordingly, when the connector assembly 120 is moved away from the opening 114 at the mating surface 112 of the connector housing 110, the connector assembly 120 may be fully retracted inside the connector housing 110 such that the door 116 may be moved to the closed position for sealing the connector housing 110 with the connector assembly 120 therein. However, when the door 116 is moved to the opened position, the connector assembly 120 may be moved towards the opening 114 at the mating surface 112 of the connector housing 110 and/or be moved to fit or insert or introduce through the opening 114 at the mating surface 112 of the connector housing 110 so as to protrude therefrom. When the connector assembly 120 is at the opening 114 of the mating surface 112 of the connector housing 110, the door 116 may not be moved to the closed position.

According to various embodiments, the connector assembly 120 may be moveable relative to the connector housing 110 along a translation axis 121. Accordingly, the connector assembly 120 may be moving in a translational motion when being moved relative to the connector housing 110 towards and/or away from the opening 114 at the mating surface 112 of the connector housing 110. Hence, all points of the connector assembly 120 may be moving uniformly in a same direction along the translation axis 121.

Figure 4A:
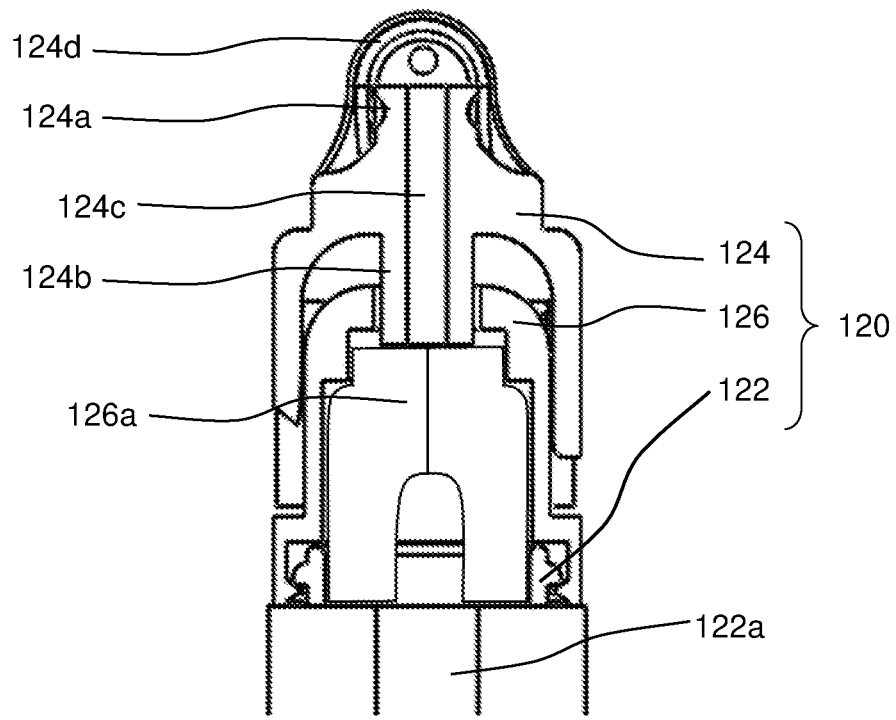
FIG. 4A shows a connector assembly each of the pair of first and second connector components with fluid flow obstructed according to various embodiments.
Figure 4B:
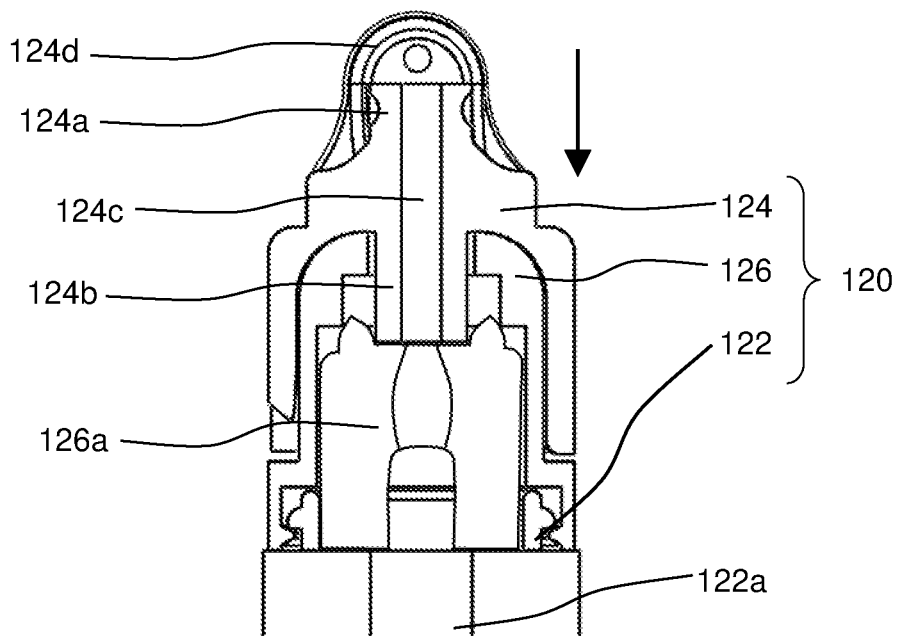
FIG. 4B shows the connector assembly 120 of FIG. 4A with the fluid flow unobstructed according to various embodiments.

FIG. 4A shows the connector assembly 120 with fluid flow obstructed according to various embodiments. FIG. 4B shows the connector assembly 120 with the fluid flow unobstructed according to various embodiments.

According to various embodiments, the connector assembly 120 may include a base member 122. The base member 122 may include a fluid port 122a. The fluid port 122a may be connectable or connected to a fluid tube 180 such that fluid may be delivered to the connector assembly 120 via the fluid port 122a from the fluid tube 180. Accordingly, the fluid port 122a may serve to establish fluid communication between the connector assembly 120 and the fluid tube 180.

According to various embodiments, the connector assembly 120 may include an engagement piece 124. The engagement piece 124 may form an end portion of the connector assembly 120 opposite the base member 122. Accordingly, the engagement piece 124 of the connector assembly 120 and the base member 122 of the connector assembly 120 may be disposed opposite to each other. Hence, the engagement piece 124 may be a free end portion of the connector assembly 120 opposite a joint between the base member 122 of the connector assembly 120 and the fluid tube 180.

According to various embodiments, the engagement piece 124 of the connector assembly 120 may include a contact portion 124a. The contact portion 124a of the engagement piece 124 may be directed towards the opening 114 at the mating surface 112 of the connector housing 110. Accordingly, moving the connector assembly 120 relative to the connector housing 110 may move the contact portion 124a of the engagement piece 124 of the connector assembly 120 towards and/or away from the opening 114 at the mating surface 112 of the connector housing 110. According to various embodiments, the contact portion 124a of the engagement piece 124 of the connector assembly 120 may be moved to the opening 114 at the mating surface 112 of the connector housing 110 and/or be moved to fit or insert or introduce through the opening 114 at the mating surface 112 of the connector housing 110 so as to protrude therefrom.

According to various embodiments, the engagement piece 124 of the connector assembly 120 may include a pusher portion 124b. The pusher portion 124b of the engagement piece 124 may be directed away from the opening 114 at the mating surface 112 of the connector housing 110. Accordingly, the contact portion 124a and the pusher portion 124b may be on opposite sides of the engagement piece 124 of the connector assembly 120. While the pusher portion 124b and the contact portion 124a may move together as a whole as they are different portions of the engagement piece 124, only the contact portion 124a of the engagement piece 124 of the connector assembly 120 may be at and/or fitted or inserted or introduced through the opening 114 at the mating surface 112 of the connector housing 110 when the connector assembly 120 is moved to the opening 114 at the mating surface 112 of the connector housing 110.

According to various embodiments, the engagement piece 124 of the connector assembly 120 may include a fluid channel 124c extending through the engagement piece 124 via the contact portion 124a and the pusher portion 124b. The fluid channel 124c may form a lumen running through the entire engagement piece 124, for example through the contact portion 124a as well as through the pusher portion 124b. Accordingly, the fluid channel 124c may have a first channel opening at a tip of the contact portion 124a of the engagement piece 124 and a second channel opening at a tip of the contact portion 124b of pusher portion 124b of the engagement piece 124 opposite the tip of the contact portion 124a of the engagement piece 124.

According to various embodiments, the connector assembly 120 may include a valve unit 126. The valve unit 126 may be disposed between the base member 122 and the engagement piece 124. Further, the valve unit 126 may be configured to open or close for controlling a flow of fluid therethrough between the base member 122 and the engagement piece 124. According to various embodiment, the valve unit 126 may include a resilient deformable valve member 126a. The resilient deformable valve member 126a may be deformable such that the shape is capable of being altered or changed from an original state (or original shape) to a deformed state (or deformed shape), and may be resilient such that the resilient deformable valve member 126a may recover or spring back from the deformed state to the original state after being deformed. Accordingly, a force may be applied to the resilient deformable valve member 126a to deform the resilient deformable valve member 126a from the original state to the deformed state, and the resilient deformable valve member 126a may recover or return or rebound back to the original state when the force is removed. According to various embodiments, when the resilient deformable valve member 126a is in the deformed state, the resilient deformable valve member 126a may be opened for the fluid to flow therethrough between the base member 122 and the engagement piece 124. According to various embodiments, when the resilient deformable valve member 126a is in the original state, the resilient deformable valve member 126a may be closed to obstruct or halt any flow of the fluid between the base member 122 and the engagement piece 124.

According to various embodiments, the resilient deformable valve member 126a of the valve unit 126 may be operable to control fluid flow through the valve unit 126 between the fluid port 122a of the base member 122 and the fluid channel 124c of the engagement piece 124. Accordingly, the resilient deformable valve member 126a of the valve unit 126 may be operated by applying the force to deform the resilient deformable valve member 126a from the original state to the deformed state so as to open the resilient deformable valve member 126a for allowing fluid flow through the valve unit 126 between the fluid port 122a of the base member 122 and the fluid channel 124c of the engagement piece 124. Further, the resilient deformable valve member 126a of the valve unit 126 may be operated by removing the force such that the deformed resilient deformable valve member 126a may recover or return or rebound back to the original state so as to close the resilient deformable valve member 126a for halting or obstructing or ceasing any flow through the valve unit 126 between the fluid port 122a of the base member 122 and the fluid channel 124c of the engagement piece 124.

According to various embodiments, the engagement piece 124 of the connector assembly 120 may be fitted to the valve unit 126 of the connector assembly 120 with the pusher portion 124b in abutment with the resilient deformable valve member 126a of the valve unit 124. Accordingly, the engagement piece 124 of the connector assembly 120 and the valve unit 126 of the connector assembly 120 may be coupled or connected or joined together in a manner such that the pusher portion 124b of the engagement piece 124 may be engaging or touching or contacting the resilient deformable valve member 126a of the valve unit 124.

According to various embodiments, the engagement piece 124 of the connector assembly 120 may be moveable relative to the base member 122. For example, the engagement piece 124 of the connector assembly 120 may be moved towards or away from the base member 122. According to various embodiments, the engagement piece 124 of the connector assembly 120 may be moveable in a manner so as to cause the pusher portion 124b to urge open the resilient deformable valve member 126a for enabling the fluid flow therethrough as the engagement piece 124 is moved towards the base member 122 under an application of a force. Accordingly, the force may be applied to move the engagement piece 124 towards the base member 122 whereby the force may be transmitted via the pusher portion 124b of the engagement piece 124 to the resilient deformable valve member 126a to urge or push against the resilient deformable valve member 126a for causing the resilient deformable valve member 126a to deform and open so as to allow the fluid flow therethrough. According to various embodiments, the engagement piece 124 of the connector assembly 120 may be moveable in a manner so as cause the resilient deformable valve member 126a to move the engagement piece 124 away from the base member 122 as the resilient deformable valve member 126a returns to its original state to close the resilient deformable valve member 126a for ceasing the fluid flow therethrough when the force is removed. Accordingly, when the force is removed, the resilient deformable valve member 126a may recover or return or rebound back to the original state, the resilient deformable valve member 126a may release an energy absorbed during deformation to move the engagement piece 124 away from the base member 122. At the same time, the resilient deformable valve member 126a may be closed to halt or obstruct or cease or stop the fluid flow through the resilient deformable valve member 126a so as to cut off any fluid flow between the fluid port 122a of the base member 122 and the fluid channel 124c of the engagement piece 124.

According to various embodiments, the connector assembly 120 may define a fluid flow path serving as a second environment within the first environment enclosed by the connector housing 110. Accordingly, the second environment may be inside the first environment. Further, the second environment may be surrounded by the first environment. The fluid flow path may include the fluid port 122a of the base member 122 and/or the resilient deformable valve member 126a of the valve unit 126 and/or the fluid channel 124c of the engagement piece 124. Accordingly, the connector assembly 120 may serve as a barrier separating or segregating the second environment and the first environment. Hence, the second environment defined by the fluid flow path may be isolated or independent from the first environment. Thus, various embodiments may provide the two-barrier system for aseptic connection.

According to various embodiments, the pair of first and second connector components 102, 104 may be removably interlockable to each other. Accordingly, the pair of first and second connector components 102, 104 may be interlocked together in a manner such that they may be subsequently disconnected or detached from each other. According to various embodiments, when the pair of first and second connector components 102, 104 are interlocked to each other, the mating surfaces 112 of the pair of first and second connector components 102, 104 may be directed towards each other and with the openings 114 at the mating surfaces 112 aligned. Accordingly, the mating surfaces 112 of the pair of first and second connector components 102, 104 may face each other and the openings 114 at the mating surfaces 112 may be lined up.

According to various embodiments, when the pair of first and second connector components 102, 104 are interlocked and the doors 116 of the connector housings 110 of the pair of first and second connector components 102, 104 are in the opened position, the connector assemblies 120 of the pair of first and second connector components 102, 104 may be respectively moveable towards the openings 114 of the mating surfaces 112 of the pair of first and second connector components 102, 104. Accordingly, with the openings 114 at the mating surfaces 112 of the pair of first and second connector components 102, 104 aligned and opened, the connector assemblies 120 of the pair of first and second connector components 102, 104 may be moved towards each other in a head-on manner, whereby the mating surface 112 of the first connector component 102 and the mating surface 112 of the second connector component 104 are directed towards each other.

According to various embodiments, the connector assemblies 120 of the pair of first and second connector components 102, 104 may be engageable with each other through the openings at the mating surfaces 112 to cause the engagement pieces 124 of the pair of first and second connector components 102, 104 to urge or push against each other. Accordingly, as the connector assemblies 120 of the pair of first and second connector components 102, 104 move towards the openings 114 of the mating surfaces 112, the engagement pieces 124 of the connector assemblies 120 of the pair of first and second connector components 102, 104 may meet and engage with each other at and/or through the openings at the mating surfaces 112. The engagement pieces 124 of the pair of first and second connector components 102, 104 may then be in an urging engagement or a pushing engagement against each other such that equal and opposite forces may be respectively applied on the engagement pieces 124 of the pair of first and second connector components 102.

According to various embodiments, with the engagement pieces 124 of the pair of first and second connector components 102, 104 urging or pushing against each other, the engagement pieces 124 of the pair of first and second connector components 102, 104 may be respectively moved towards the base members 122 of the pair of first and second connector components 102, 104 to urge open the resilient deformable valve members 126a of the valve units 126 of the pair of first and second connector components 102, 104. Accordingly, the equal and opposite forces from the urging engagement or the pushing engagement may move the engagement pieces 124 of the pair of first and second connector components 102, 104 respectively moved towards the base members 122 of the pair of first and second connector components 102, 104. The equal and opposite forces may then be transmitted through the engagement pieces 124 of the pair of first and second connector components 102, 104 to respectively deform the resilient deformable valve members 126a of the valve units 126 of the pair of first and second connector components 102, 104 for opening the resilient deformable valve members 126a of the valve units 126 of the pair of first and second connector components 102, 104.

According to various embodiments, with both the resilient deformable valve members 126a of the valve units 126 of the pair of first and second connector components 102, 104 deformed and opened, a fluid connection through the connector assemblies 120 of the pair of first and second connector components 102, 104 between the fluid ports 122a of the base members 122 of the pair of first and second connector components 102, 104 may be established. Accordingly, the fluid may flow from the fluid port 122a of the base member 122 of the first connector component 102, through the resilient deformable valve member 126a of the valve unit 126 of the first connector component 102, through the fluid channel 124c of the engagement piece 124 of the first connector component 102, across a connection between the fluid channel 124c of the engagement piece 124 of the first connector component 102 and the fluid channel 124c of the engagement piece 124 of the second connector component 104, through the fluid channel 124c of the engagement piece 124 of the second connector component 104, through the resilient deformable valve member 126a of the valve unit 126 of the second connector component 104, to the fluid port 122a of the base member 122 of the second connector component 104, and vice versa. Hence, a fluid path through the pair of first and second connector components 102, 104 may be via the engagement of the connector assemblies 120 of the pair of first and second connector components 102, 104.

According to various embodiments, the engagement of the connector assemblies 120 of the pair of first and second connector components 102, 104 may connect the second environments of the pair of first and second connector components 102, 104 in a seamless manner along the fluid path which runs through the first environments of the pair of first and second connector components 102, 104 connected via interlocking the first and second connector components 102, 104. Accordingly, when the first and second connector components 102, 104 are interlocked and the connector assemblies 120 of the pair of first and second connector components 102, 104 are engaged to each other, the connected first environments of the pair of first and second connector components 102, 104 may be isolated from the external environment by the connector housings 110 of pair of first and second connector components 102, 104, and the connected second environments of the pair of first and second connector components 102, 104 along the fluid path may be isolated from the connected first environments by the connector assemblies 120 of the pair of first and second connector components 102, 104. Thus, various embodiments may provide the two-barrier systems for aseptic connection.

According to various embodiments, the translation axis 121 of the connector assembly 120 of each of the pair of first and second connector components 102, 104 may be perpendicular to the mating surface 112 of the connector housing 110. Accordingly, the connector assembly 120 of each of the pair of first and second connector components 102, 104 may be moveable in a direction perpendicular to the mating surface 112 of the connector housing 110. Hence, the connector assembly 120 of each of the pair of first and second connector components 102 may be moving perpendicularly to the mating surface 112 of the connector housing 110 when moving towards or away from the opening 114 at the mating surface 112 of the connector housing 110.

According to various embodiments, the connector assembly 120 of each of the pair of first and second connector components 102, 104 may be oriented with the engagement piece 124, the valve unit 126 and the base member 122 in sequence, wherein the base member 122 may be farthest away from the opening 114 at the mating surface 112 of the connector housing 110. Accordingly, an arrangement of the engagement piece 124, the valve unit 126 and the base member 122 may be in the order of the engagement piece 124, followed by the valve unit 126, and followed by the base member 122. Hence, the valve unit 126 may be between the engagement piece 124, and the base member 122. Further, the connector assembly 120 of each of the pair of first and second connector components 102, 104 may be disposed in an orientation whereby the order of arrangement of the engagement piece 124, the valve unit 126 and the base member 122 with the engagement piece 124 being closest and directed towards the opening 114 at the mating surface 112 of the connector housing 110 and the base member 122 being farthest and directed away from the opening 114 at the mating surface 112 of the connector housing 110.

According to various embodiments, the connector assembly 120 of each of the pair of first and second connector components 102, 104 may be of an elongated shape whereby the engagement piece 124, and the base member 122 may be at two opposite end portions of the connector assembly 120 while the valve unit 126 may be in a middle. Accordingly, the connector assembly 120 may be oriented such that a longitudinal axis of the elongated connector assembly 120 may be perpendicular to the mating surface 112 of the connector housing 110, whereby the end portion with the engagement piece 124 may be closest and directed towards the opening 114 at the mating surface 112 of the connector housing 110 and the end portion with the base member 122 may be farthest and directed away from the opening 114 at the mating surface 112 of the connector housing 110.

According to various embodiments, the fluid channel 124c of the engagement piece 124 may be a straight channel extending through the engagement piece 124. Accordingly, the fluid channel 124c may extend from the tip of the contact portion 124a of the engagement piece 124 directly to the tip of the contact portion 124b of pusher portion 124b of the engagement piece 124 in a straight line manner. When the connector assembly 120 of each of the pair of first and second connector components 102, 104 is of the elongated shape, the fluid channel 124c in the form of the straight channel may be aligned to the longitudinal axis of the elongated connector assembly 120. For example, the fluid channel 124c in the form of the straight channel may be parallel or coincide with the longitudinal axis of the elongated connector assembly 120.

According to various embodiments, the resilient deformable valve member 126a of the valve unit 126 may immediately recover or return or rebound back to the original state to close the resilient deformable valve member 126a for halting or obstructing or ceasing the fluid flow therethrough when the force is removed. Accordingly, the resilient deformable valve member 126a may be configured to instantaneously recover or return or rebound back to the original state upon remove of the force causing the deformation. The resilient deformable valve member 126a may be configured based on its structure, shape, dimension, and/or material. With the resilient deformable valve member 126a of the valve unit 126 capable of recovering or returning or rebounding back to the original state instantaneously or immediately, the resilient deformable valve member 126a of the valve unit 126 may be capable of serving as a drip-free valve.

According to various embodiments, the contact portion 124a of the engagement piece 124 of the connector assembly 120 of each of the pair of first and second connector components 102, 104 may include at least one self-alignment protrusion 124d. According to various embodiments, the self-alignment protrusions 124d of the engagement pieces 124 of the pair of first and second connector components 102, 104 may self-align with each other to align and fluidly connect the fluid channels 124c of the engagement pieces 124 of the pair of first and second connector components 102, 104 when the connector assemblies 120 of the pair of first and second connector components 102, 104 are engaged to each other. Accordingly, the self-alignment protrusion 124d of each of the pair of first and second connector components 102, 104 may have a structure and/or a shape which would slide to align and engage with a corresponding self-alignment protrusion 124d such that the engagement pieces 124 of the pair of first and second connector components 102, 104 may be fluidly connected together without requiring additional manual fine tuning or manual minute adjustment to ensure the engagement pieces 124 of the pair of first and second connector components 102, 104 are fluidly connected together. According to various embodiments, the contact portion 124a of the engagement piece 124 of the connector assembly 120 of each of the pair of first and second connector components 102, 104 may include a pair of self-alignment protrusions 124d and a pair of self-alignment recesses arranged in an alternating arrangement around a circumference of the contact portion 124a. In an example, the alternating arrangement of self-alignment protrusions 124d and self-alignment recesses may be continuous and may form a wave-like pattern, whereby the self-alignment protrusions 124d form the crests and the self-alignment recesses form the troughs. Accordingly, in such an example, the crest-like self-alignment protrusion 124d of the engagement piece 124 of the first connector component 102 may slide against a corresponding crest-like self-alignment protrusion 124d of the engagement piece 124 of the second connector component 104 for sliding into a corresponding trough-like self-alignment recess of the engagement piece 124 of the second connector component 104 such that the engagement pieces 124 of the pair of first and second connector components 102, 104 may be aligned and fluidly connected together.

Referring to FIG. 1A, according to various embodiments, the connector housing 110 of each of the pair of first and second connector components 102, 104 may include a first part 110a having the mating surface 112 which have the opening 114. Further, the connector housing 110 may include a second part 110b rotatably coupled to the first part 110a. The connector housing 110 may also include a third part 110c rotatably coupled to the second part 110b. Accordingly, the connector housing 110 may include the first part 110a, the second part 110b and the third part 110c, wherein the second part 110b is rotatable relative to the first part 110a and the third part 110c is rotatable relative to the second part 110b. According to various embodiments, the connector housing 110 may be arranged in the order of the first part 110a, followed by the second part 110b, and followed by the third part 110c. Accordingly, the first part 110a, the second part 110b, and the third part 110c may be arranged in a line with the second part 110b between the first part 110a and the third part 110c.

According to various embodiments, each of the pair of first and second connector components 102, 104 may further include a door mechanism 130 coupled to the door 116. The door mechanism 130 may be configured to open or close the door 116. Further, rotating the first part 110a and the second part 110b of the connector housing 110 may cause the door mechanism 130 to open or close the door 116. According to various embodiments, the door mechanism 130 may be operably connected to one or both of the first part 110a and the second part 110b of the connector housing 110 in a manner so as to move the door 116 between the closed position and the opened position when the first part 110a and the second part 110b of the connector housing 110 are rotated relative to each other about a first rotational axis 111a. Accordingly, the door mechanism 130 may be connected in a manner so as to be capable of interacting with one or both of the first part 110a and the second part 110b such that the door mechanism 130 may work in concert with the relative rotation between the first part 110a and the second part 110b about the first rotational axis 111a to move the door 116 between the closed position and the opened position for closing or opening the door 116.

According to various embodiments, the door mechanism 130 may be configured to rotate or revolve the door 116 about the first rotational axis 111a. According to various embodiments, the door 116 may be offset from the first rotational axis 111a, whereby the rotational axis 111a does not pass through the door 116. Accordingly, rotating or revolving the door 116 about first rotational axis 111a may result in the door 116 orbiting or circling about the first rotational axis 111a. According to various embodiments, the door 116 may be rotated together with the second part 110b as the second part 110b is rotated relative to the first part 110a about the first rotational axis 111a. Accordingly, a motion of the door 116 may be synchronised with the relative rotation between the second part 110b and the first part 110a. Hence, the door mechanism 130 may move the door 116 at the same time and together with the relative rotation between the second part 110b and the first part 110a.

According to various embodiments, the door mechanism 130 may be further configured to simultaneously move the door 116 inwards and away from the first part 110a (or the opening 114 at the mating surface 112 of the first part 110a) as the second part 110b is rotated relative to the first part 110a about the first rotational axis 111a. Accordingly, in addition to rotating or revolving the door 116 about the first rotational axis 111a, the door mechanism 130 may move the door 116 inwards, in a direction extending from the first part 110a to the third part 110c, with respect to the opening 114 at the mating surface 112 of the connector housing 110. Hence, the door 116 may be rotating or revolving about the first rotational axis 111a and concurrently lifting away in an inward direction from the opening 114 at the mating surface 112 of the connector housing 110. According to various embodiments, the combination of the door 116 rotating or revolving about the first rotational axis 111a and concurrently lifting away in an inward direction may result in the door 116 moving along a curve path or a helical path. Hence, the door mechanism 130 may be configured to move the door 116 along the curve path or the helical path. By moving the door 116 in this manner, the door 116 may be kept clear of the opening 114 at the mating surface 112 of the first part 110a of the connector housing 110 when in the opened position.

According to various embodiments, the first rotational axis 111a may be perpendicular to the mating surface 112 of the first part 110a of the connector housing 110. Accordingly, the first part 110a and the second part 110b may be rotated relative to each other with the mating surface 112 of the first part 110a maintained perpendicular to the first rotational axis 111a.

According to various embodiments, the door mechanism 130 may include a link arm 132. A first end 132a of the link arm 132 may be pivotably coupled to the second part 110b.

Accordingly, the link arm 132 may be pivotable relative to the second part 110*b* about a pivoting axis of a pivot 132*c* between the first end 132*a* of the link arm 132 and the second part 110*b*. Further, the pivot 132*c* between the first end 132*a* of the link arm 132 and the second part 110*b* may be configured to pivot the link arm 130 inwards and away from the first part 110*a* (or in the direction extending from the first part 110*a* to the third part 110*c*). According to various embodiments, the door 116 may be fixedly attached to a second end 132*b* of the link arm 132. Accordingly, the door 116 may be moved by the link arm 132 as the link arm 132 is pivoted about the pivoting axis of the pivot 132*c* between the first end 132*a* of the link arm 132 and the second part 110*b*. When the link arm 132 is pivoted about the pivoting axis of the pivot 132*c*, the door 116 may be correspondingly moved inwards and away from the first part 110*a* (or the opening 114 at the mating surface 112 of the first part 110*a*). Hence, with the door 116 attached to the second end 132*b* of the link arm 132, the pivot 132*c* between the first end 132*a* of the link arm 132 and the second part 110*b* may enable the door 116 to be moved inwards and lifted off the opening 114 at the mating surface 112 of the first part 110*a*.

According to various embodiments, the door mechanism 130 may further include an extension portion 134. The extension portion 134 may be extending from the second end 132*b* of the link arm 132. Hence, the extension portion 134 may serve as an extension or an appendage of the link arm 132. According to various embodiments, the extension portion 134 may extend beyond the second end 132*b* of the link arm 132 and/or beyond the door 116 attached to the second end 132*b* of the link arm 132. According to various embodiments, the extension portion 134 may include an engagement element 138 at a tip of the extension portion 134. The tip of the extension portion 134 may be a free-end of the extension portion 134 opposite a joint between the second end 132*b* of the link arm 132 and the extension portion 134.

According to various embodiments, the first part 110*a* may include an inner cylindrical surface. Accordingly, an interior of the first part 110*a* may include the inner cylindrical surface. According to various embodiments, the inner cylindrical surface of the first part 110*a* may include a curve (or helical) guide element 136. As an example, the curve (or helical) guide element 136 may be in the form of a curve (or helical) groove. According to various embodiments, the engagement element 138 at the tip of the extension portion 134 may be configured to engage with the curve (or helical) guide element 136. Accordingly, the engagement element 138 at the tip of the extension portion 134 may interact with the curve (or helical) guide element 136 in a manner such that a movement of the engagement element 138 at the tip of the extension portion 134 may be guided by the curve (or helical) guide element 136. Hence, the engagement element 138 at the tip of the extension portion 134 may be guided to slide along the curve (or helical) guide element 136.

According to various embodiments, when the engagement element 138 at the tip of the extension portion 134 is in engagement with the curve (or helical) guide element 136, relative rotation of the first part 110*a* and the second part 110*b* about the first rotational axis 111*a* may slide the engagement element 138 at the tip of the extension portion 134 along the curve (or helical) guide element 136 of the first part 110*a* to simultaneously rotate or revolve the door 116 about the first rotational axis 111*a* and pivot the link arm 132 to move the door 116 inward and away from the first part 110*a* (or the opening 114 at the mating surface 112 of the first part 110*a*). Accordingly, relative rotation of the first part 110*a* and the second part 110*b* about the first rotational axis 111*a* may rotate the link arm 132 together with the second part 110*b* about the first rotational axis 111*a* for rotating or revolving the door 116 at the second end 132*b* of the link arm 132 about the first rotational axis 111*a*. At the same time, the engagement element 138 at the tip of the extension portion 134 may concurrently slide along the curve (or helical) guide element 136 of the first part 110*a* to pivot the link arm 132 inward about the pivoting axis of the pivot 132*c* for simultaneously moving the door inwards. Hence, the combination of the rotation of the link arm 132 about the first rotational axis 111 together with the pivoting of the link arm 132 about the pivoting axis of the pivot 132*c* may cause the door 116 to move along a curve path or a helical path from the closed position to the opened position. According to various embodiments, an outward facing side 116*a* of the door 116 may recede inward from the mating surface 112 of the first part 110*a* and rotate or revolve about the first rotational axis 111*a* in a manner so as to be free of contact with the connector housing 110 and the connector assembly 120. Accordingly, the door 116 may be withdrawn inwards with respect to the opening 114 at the mating surface 112 of the first part 110*a* and rotated or revolved about the first rotational axis 111*a* to move out of alignment (or offset) from the opening 114 at the mating surface 112 of the first part 110*a* such that the door 116 may be cleared from the opening 114 at the mating surface 112 of the first part 110*a* in order for the opening 114 at the mating surface 112 of the first part 110*a* to be unobstructed or unblocked.

Figure 5A:
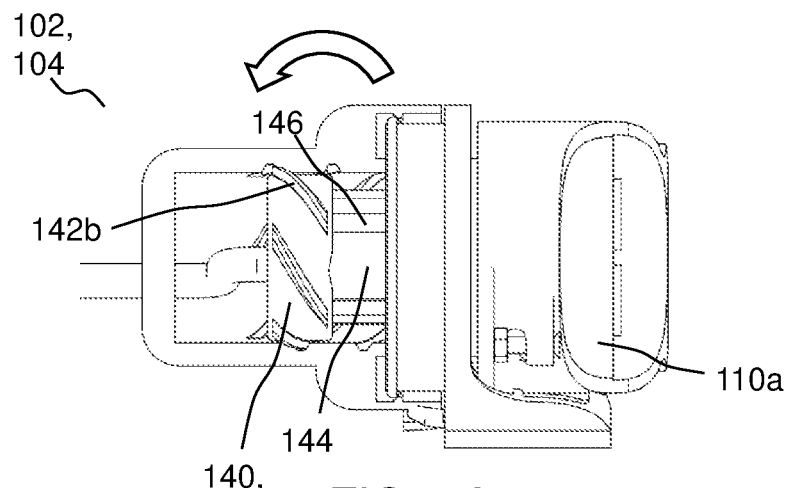
FIG. 5A to FIG. 5B show a sequence of relative rotation of a third part and a second part of a connector housing of each of the pair of first and second connector components with the third part partially cut away according to various embodiments.
Figure 5B:
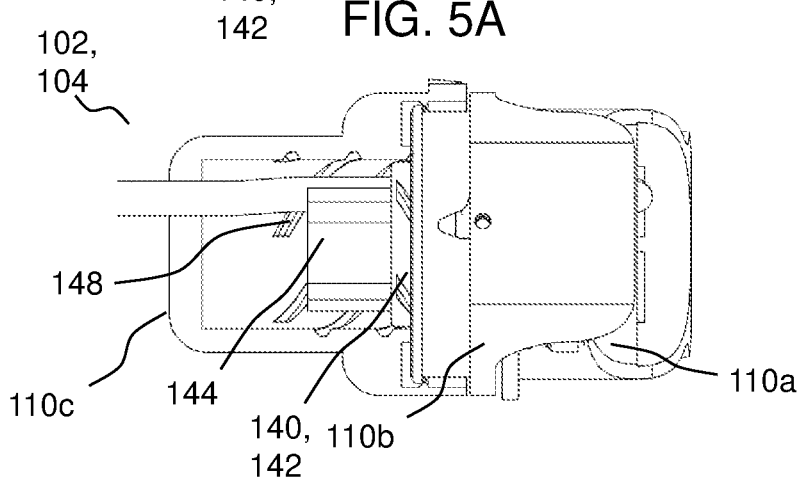

FIG. 5A to FIG. 5B show a sequence of relative rotation of the third part 110*c* and the second part 110*b* of the connector housing 110 with the third part 110*c* partially cut away according to various embodiments. According to various embodiments, each of the pair of first and second connector components 102, 104 may further include a rotary-to-linear motion converter mechanism 140 coupled to the connector assembly 120. The rotary-to-linear motion converter mechanism 140 may be operably connected to one or both of the second part 110*b* and the third part 110*c* of the connector housing 110 in a manner so as to move the connector assembly 120 towards or away from the opening 114 at the mating surface 112 of the connector housing 110 along the translation axis 121 when the second part 110*b* and the third part 110*c* of the connector housing 110 are rotated relative to each other about a second rotational axis 111*b*. Accordingly, the rotary-to-linear motion converter mechanism 140 may be connected in a manner so as to be capable of interacting with one or both of the second part 110*b* and the third part 110*c* such that the rotary-to-linear motion converter mechanism 140 may work in concert with the relative rotation between the second part 110*b* and the third part 110*c* about the second rotational axis 111*b* to move the connector assembly 120 towards or away from the opening 114 at the mating surface 112 of the connector housing 110 along the translation axis 121.

According to various embodiments, the rotary-to-linear motion converter mechanism 140 may be configured to convert the relative rotation between the second part 110*b* and the third part 110*c* of the connector housing 110 about the second rotational axis 111*b* into a linear translation motion of the connector assembly 120 along the translation axis 121. Accordingly, a rotary motion between the second part 110*b* and the third part 110*c* of the connector housing 110 may be provided as input motion to the rotary-to-linear motion converter mechanism 140 which may convert the rotary motion to output the linear translation motion to the connector assembly 120 for translating the connector assembly 120 linearly along the translation axis 121. Hence, rotating the second part 110b and the third part 110c of the connector housing 110 relative to each other may move the connector assembly 120 along the translation axis 121 due to the conversion of the rotary motion between the second part 110b and the third part 110c of the connector housing 110 to the linear translation motion output to the connector assembly 120 by the rotary-to-linear motion converter mechanism 140.

According to various embodiments, the connector assembly 120 may be slidably coupled to the second part 110b of the connector housing 110 so as to be slidable along the translation axis 121 with respect to the second part 110b. Accordingly, the connector assembly 120 may be in sliding engagement with the second part 110b of the connector housing 110 such that the connector assembly 120 may slide relative to the second part 110b along the translation axis 121. Further, the connector assembly 120 and the second part 110b of the connector housing 110 may be non-rotatable relative to each other. For example, the connector assembly 120 and the second part 110b of the connector housing 110 may be non-rotatable relative to each other about the second rotational axis 111b, which the second part 110b and the third part 110c may be relatively rotated.

According to various embodiments, the rotary-to-linear motion converter mechanism 140 may be coupled to the connector assembly 120 and operably connected to the third part 110c of the connector housing 110. Accordingly, the connector assembly 120 may be coupled to the rotary-to-linear motion converter mechanism 140 in a manner such that an output motion of the rotary-to-linear motion converter mechanism 140 may be transmitted to the connector assembly 120. On the other hand, the rotary-to-linear motion converter mechanism 140 and the third part 110c of the connector housing 110 may be connected via interacting with each other such that the rotary motion of the third part 110c relative to the second part 110b may be input to the rotary-to-linear motion converter mechanism 140 whereby the rotary-to-linear motion converter mechanism 140 may work in concert with the rotary motion to output the linear translation motion to the connector assembly 120.

According to various embodiments, the rotary-to-linear motion converter mechanism 140 may convert the relative rotation between the second part 110b and the third part 110c of the connector housing 110 about the second rotational axis 111b into the linear translation motion of the connector assembly 120 along the translation axis 121 to slide the connector assembly 120 along the second part 110b. Since the connector assembly 120 may be in sliding engagement with the second part 110b of the connector housing 110, when the rotary-to-linear motion converter mechanism 140 converts the rotary motion between the second part 110b and the third part 110c of the connector housing 110 to output the linear translation motion, the linear translation motion may be transmitted to the connector assembly 120 for sliding the connector assembly 120 relative to the second part 110b along the translation axis 121. Hence, the connector assembly 120 may slide relative to the second part 110b along the translation axis 121 with the linear translation motion transmitted to the connector assembly 120 from the rotary-to-linear motion converter mechanism 140, whereby the linear translation motion is converted from the rotary motion between the second part 110b and the third part 110c of the connector housing 110 by the rotary-to-linear motion converter mechanism 140.

According to various embodiments, the translation axis 121 may be parallel to the second rotational axis 111b. Accordingly, the second rotational axis 111b about which the second part 110b and the third part 110c of the connector housing 110 relatively rotate and the translation axis 121 along with the connector assembly 120 is moveable may be parallel to each other. Hence, a rotary motion input axis of the rotary-to-linear motion converter mechanism 140 and a linear translation motion output axis of the rotary-to-linear motion converter mechanism 140 may be parallel to each other.

According to various embodiments, the rotary-to-linear motion converter mechanism 140 may include a ring 142 coupled to the connector assembly 120. Further, the ring 142 may be coupled to the base member 122 or the valve unit 126 of the connector assembly 120. The connector assembly 120 may be coupled to the ring 142 in a manner so as to be moveable together with the ring 142 as a whole. According to various embodiments, the ring 142 may include at least one engagement element 142a along a first surface (e.g. inner ring surface) of the ring 142 and at least one threading 142b along a second surface (e.g. outer ring surface) of the ring 142. The first surface of the ring 142 and the second surface of the ring 142 may be opposite surfaces of the ring 142.

According to various embodiments, the second part 110b of the connector housing 110 may include an elongated portion 144. The elongated portion 144 may be an internal portion of the second part 110b suspended within the first environment enclosed by the connector housing 110. According to various embodiments, the elongated portion 114 of the second part 110b may include at least one linear guide element 146 extending lengthwise. Hence, the at least one linear guide element 146 may be extending longitudinally along the elongated portion 114 of the second part 110b. According to various embodiments, the elongated portion 144 of the second part 110b may be inserted through the ring 142 of the rotary-to-linear motion converter mechanism 140. Accordingly, the ring 142 of the rotary-to-linear motion converter mechanism 140 may be placed or fitted over the elongated portion 144 of the second part 110b. Further, the at least one engagement element 142a along the first surface of the ring 142 of the rotary-to-linear motion converter mechanism 140 may be in sliding engagement with the at least one linear guide element 146 along the elongated portion 144 of the second part 110b of the connector housing 110. Hence, the ring 142 of the rotary-to-linear motion converter mechanism 140 and the elongated portion 144 of the second part 110b may be slidable relative to each other via the interaction between the at least one engagement element 142a along the first surface of the ring 142 and the at least one linear guide element 146 along the elongated portion 144 of the second part 110b.

According to various embodiments, the third part 110c of the connector housing 110 may include at least one complementary threading 148 along a surface (e.g. inner cylindrical surface) of the third part 110c. The at least one complementary threading 148 of the third part 110c may be in engagement with the at least one threading 142b along the second surface of the ring 142 of the rotary-to-linear motion converter mechanism 140. Accordingly, the engagement between the at least one complementary threading 148 of the third part 110c and the at least one threading 142b along the second surface of the ring 142 may be a screw engagement. For example, the at least one complementary threading 148 of the third part 110c may be internal screw threading or internal threading groove, while the at least one threading 142b of the ring 142 may be external screw threading or external threading ridges.

According to various embodiments, the relative rotation between the second part 110b and the third part 110c of the connector housing 110 may cause the at least one threading 142b along the second surface of the ring 142 to slide along the at least one complementary threading 148 of the third part 110c and the at least one engagement element 142a along the first surface of the ring 142 to slide along the at least one linear guide element 146 along the elongated portion 144 of the second part 110b. Accordingly, when the second part 110b and the third part 110c of the connector housing 110 are rotated relative to each other, the interaction between the at least one threading 142b along the second surface of the ring 142 and the at least one complementary threading 148 of the third part 110c together with the interaction between the at least one engagement element 142a along the first surface of the ring 142 and the at least one linear guide element 146 along the elongated portion 144 of the second part 110b may result in the ring 142 of the rotary-to-linear motion converter mechanism 140 translating along the translation axis 121 to move the connector assembly 120 along the translation axis 121. In particular, the third part 110c may impart the rotary motion between the second part 110b and the third part 110c to the interaction between the at least one threading 142b along the second surface of the ring 142 and the at least one complementary threading 148 of the third part 110c. Due to the screw engagement between the at least one threading 142b along the second surface of the ring 142 and the at least one complementary threading 148 of the third part 110c, the rotary motion may be converted to the linear translation motion of the ring 142 of the rotary-to-linear motion converter mechanism 140. Further, the interaction between the at least one engagement element 142a along the first surface of the ring 142 and the at least one linear guide element 146 along the elongated portion 144 of the second part 110b may prevent any relative rotation between the ring 142 and the elongated portion 144 of the second part 110b and may guide the ring 142 to only translate longitudinally along the elongated portion 144 of the second part 110b. Thus, the linear translation motion of the ring 142 of the rotary-to-linear motion converter mechanism 140 along the elongated portion 144 of the second part 110b along the translation axis 121 may serve as the output motion of the rotary-to-linear motion converter mechanism 140 for moving the connector assembly 120 along the translation axis 121.

According to various embodiments, to connect the pair of first and second connector components 102, 104 together, the second part 110b and the first part 110a of the connector housing 110 of each of pair of first and second connector components 102, 104 may be rotated relative to each other so as to move the door 116 to the opened position while moving the connector assembly 120 together with the second part 110b to align to the opening 114 at the mating surface 112 of the first part 110a of the connector housing 110. Subsequently, the third part 110c and the second part 110b of the connector housing 110 of each of pair of first and second connector components 102, 104 may be rotated relative to each other so as to convert the rotary motion between the third part 110c and the second part 110b into the linear translation motion moving the connector assembly 120 along the translation axis 121 towards the opening 114 at the mating surface 112 of the first part 110a of the connector housing 110. The engagement pieces 124 of the connector assemblies 120 of the pair of first and second connector components 102, 104 may then meet and engage to each other at the openings 114 of the mating surfaces 112 of the connector housings 110 of the pair of first and second connector components 102, 104.

According to an example embodiment, the connector housing 110 may be of a cylindrical shape. Accordingly, the mating surface 112 may be an end surface of the cylindrical shape and may be circular. Further, the first part 110a, the second part 110b, and the third part 110c may be arranged in a coaxial manner whereby the common axis may a cylindrical axis. Accordingly, the second part 110b and the first part 110a may be rotatable relative to each other about the first rotational axis 111a which may coincide with the cylindrical axis, and the third part 110c and the second part 110b may be rotatable relative to each other about the second rotational axis 111b which may coincide with the cylindrical axis. Hence, the first rotational axis 111a and the second rotational axis 111b may coincide with each other and may be the cylindrical axis.

According to various embodiments, the first part 110a of the connector housing 110 may include an alignment element 150 configured for self-alignment of the openings 114 at the mating surfaces 112 of the connector housings 110 of the pair of first and second connector components 102, 104 when the pair of first and second connector components 102, 104 are removably interlocked to each other. According to various embodiments, the alignment element 150 may include a rim or a ledge or a flange or a shelf-like circumferential structure have a curved slope. Further, the curved slope may have an S-shaped curve. Accordingly, with the alignment element 150, the connector housings 110 of the pair of first and second connector components 102, 104 may slide into position and align with each other such that the openings 114 at the mating surfaces 112 of the connector housings 110 of the pair of first and second connector components 102, 104 when the pair of first and second connector components 102, 104 are pushed towards each other head-on, with the mating surface 112 of the first connector component 102 and the mating surface 112 of the second connector component 104 directed towards each other, for connecting the pair of first and second connector components 102, 104.

According to various embodiments, the connector housing housing 110 may include a twist lock mechanism 152 for removably interlocking the pair of first and second connector components 102, 104 to each other. According to various embodiments, the twist lock mechanism 152 may be configured to interlock the pair of first and second connector components 102, 104 when the second part 110b and the first part 110a of the connector housing 110 are rotated relative to each other upon pushing the pair of first and second connector components 102, 104 towards each other head-on. According to various embodiments, the twist lock mechanism 152 may include a radial lip 152a protruding outwardly from first part 110a of the connector housing 110. Further, the second part 110b of the connector housing 110 may include a corresponding catch 152b. Accordingly, when the first parts 110a of the connector housing 110a of the pair of first and second connector components 102, 104 are aligned and engaged to each other, the second part 110b and the first part 110a of the connector housing 110 of each of pair of first and second connector components 102, 104 may be rotated relative to each other for removably interlocking the pair of first and second connector components 102, 104. When the second part 110b and the first part 110a of the connector housing 110 of the first connector component 102 are rotated relative to each other, the corresponding catch 152b of the second part 110b of the connector housing 110 of the first connector component 102 may slide onto the radial lip 152a of the first part 110a of the connector housing 110 of the second connector component 104. Similarly, when the second part 110b and the first part 110a of the connector housing 110 of the second connector component 104 are rotated relative to each other, the corresponding catch 152b of the second part 110b of the connector housing 110 of the second connector component 104 may slide onto the radial lip 152a of the first part 110a of the connector housing 110 of the first connector component 102. In this manner, the pair of first and second connector components 102, 104 may be removably interlocked to each other.

According to various embodiment, when the second part 110b and the first part 110a of the connector housing 110 are rotated relative to each other for interlocking the pair of first and second connector components 102, 104, the door 116 of the connector housing 110 may be simultaneously moved from the closed position to the opened position. Accordingly, a single relative rotation of the second part 110b and the first part 110a of the connector housing 110 may simultaneously move the door 116 of the connector housing 110 to the opened position and operate the twist lock mechanism 152 for interlocking the pair of first and second connector components 102, 104.

Figure 6A:
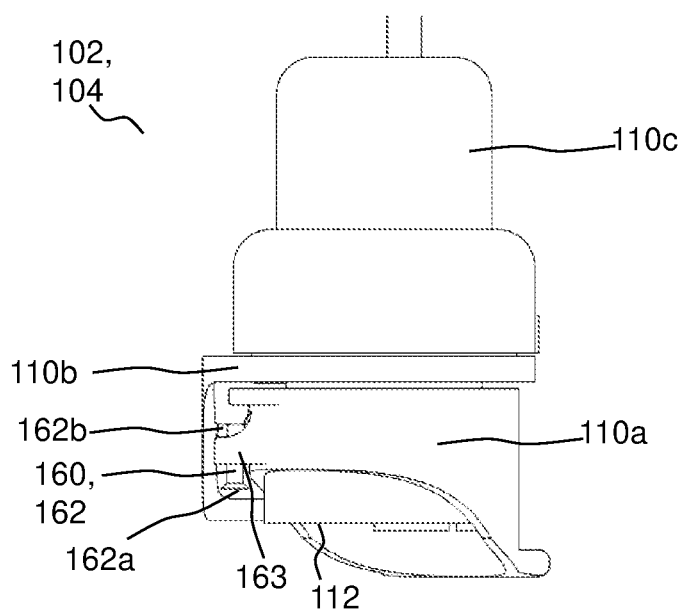
FIG. 6A shows a side view of the connector housing of each of the pair of first and second connector components with an anti-rotation lock in a locked position for locking a first part and the second part of the connector housing from relative rotation according to various embodiments.
Figure 6B:
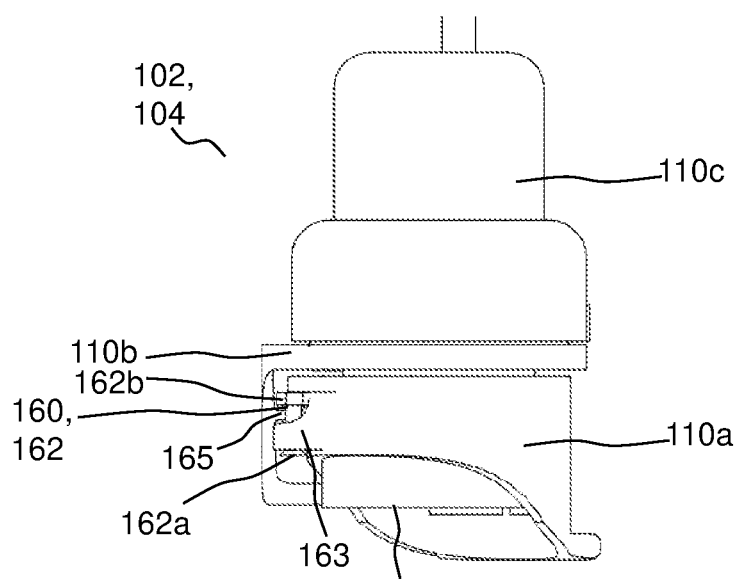
FIG. 6B shows a side view of the connector housing of FIG. 6A with the anti-rotation lock 160 in an unlocked position for unlocking the first part and the second part of the connector housing to allow relative rotation according to various embodiments.

FIG. 6A shows a side view of the connector housing 110 with an anti-rotation lock 160 in a locked position for locking the first part 110a and the second part 110b from relative rotation according to various embodiments. FIG. 6B shows a side view of the connector housing 110 with the anti-rotation lock 160 in an unlocked position for unlocking the first part 110a and the second part 110b to allow relative rotation according to various embodiments.

According to various embodiments, each of the pair of the first and second connector components 102, 104 may include the anti-rotation lock 160. According to various embodiments, the anti-rotation lock 160 may be operably connected between the first part 110a and the second part 110b of the connector housing 110 to lock the first part 110a and the second part 110b from relative rotation when the mating surfaces 112 of the pair of first and second connector component 102, 104 are disconnected and to unlock the first part 110a and the second part 110b for allowing relative rotation when the mating surfaces 112 of the pair of first and second connector components 102, 104 are abutting each other. Accordingly, the anti-rotation lock 160 may be connected in a manner so as to be capable of interacting with the first part 110a and the second part 110b such that the anti-rotation lock 160 may switch between the locked position or the unlocked position depending on whether the mating surfaces 112 of the pair of first and second connector components 102, 104 are abutting each other.

According to various embodiments, the anti-rotation lock 160 may be disposed at the first part 110a of the connector housing 110 and operably connected to the second part 110b of the connector housing 110 to lock the first part 110a and the second part 110b from relative rotation, for example by obstructing or impeding or blocking the second part 110b to rotate relative to the first part 110a, when the mating surfaces 112 of the pair of first and second connector components 102, 104 are disconnected or separated. Accordingly, the anti-rotation lock 160 may be operated with respect from the first part 110a to engage the second part 110b so as to obstruct or impede or block the second part 110b from rotating relative to the first part 110a when the mating surfaces 112 of the pair of first and second connector components 102, 104 are disconnected or separated. On the other hand, the anti-rotation lock 160 disposed at the first part 110a of the connector housing 110 may unlock the first part 110a and the second part 110b for allowing relative rotation, for example by removing any obstruction or blockage or stopper preventing relative rotation, when the mating surfaces 112 of the pair of first and second connector components 102, 104 are abutting each other. Accordingly, abutting or engaging the mating surfaces 112 of the pair of first and second connector components 102, 104 to each other may cause the anti-rotation lock 160 to disengage the second part 110b so as to clear any obstruction or blockage caused by the anti-rotation lock 160 in order to allow relative rotation between the first part 110a and the second part 110b.

According to an example embodiment, the anti-rotation lock 160 may include a spring-loaded pin 162 having a pin-head 162a and a latch element 162b. The anti-rotation lock 160 may be disposed at a side of the first part 110a of the connector housing 110 with the spring-loaded pin 162 held by a lateral protrusion 163 of the first part 110a. The pin-head 162a may be biased to protrude from the lateral protrusion 163 of the first part 110a in a direction which the mating surfaces 112 of the first part 110a is facing. With the pin-head 162a protruding, the latch element 162b of the spring-loaded pin 162 may be in a position to obstruct or impede or block a portion 165 of the second part 110b of the connector housing 110, e.g. an edge or a corner or a surface or a protrusion or a recess or a step etc. When the mating surfaces 112 of the pair of first and second connector components 102, 104 are abutting to each other, the pin-head 162a may be pushed into the lateral protrusion 163 of the first part 110a of the connector housing 110 and the latch element 162b of the spring-loaded pin 162 may be moved out of the position that was obstructing or impeding or blocking the portion 165 of the second part 110b of the connector housing 110. Hence, the anti-rotation lock 160 may be unlocked and relative rotation between the first part 110a and the second part 110b may be permitted. According to various embodiments, the pin-head 162a of the anti-rotation lock 160 of the first connector component 102 may be pushed by the radial lip 152a of the first part 110a of the connector housing 110 of the second connector component 104 when the mating surfaces 112 of the pair of first and second connector components 102, 104 are abutting each other. Similarly, the pin-head 162a of the anti-rotation lock 160 of the second connector component 104 may be pushed by the radial lip 152a of the first part 110a of the connector housing 110 of the first connector component 102 when the mating surfaces 112 of the pair of first and second connector components 102, 104 are abutting each other.

Figure 7A:
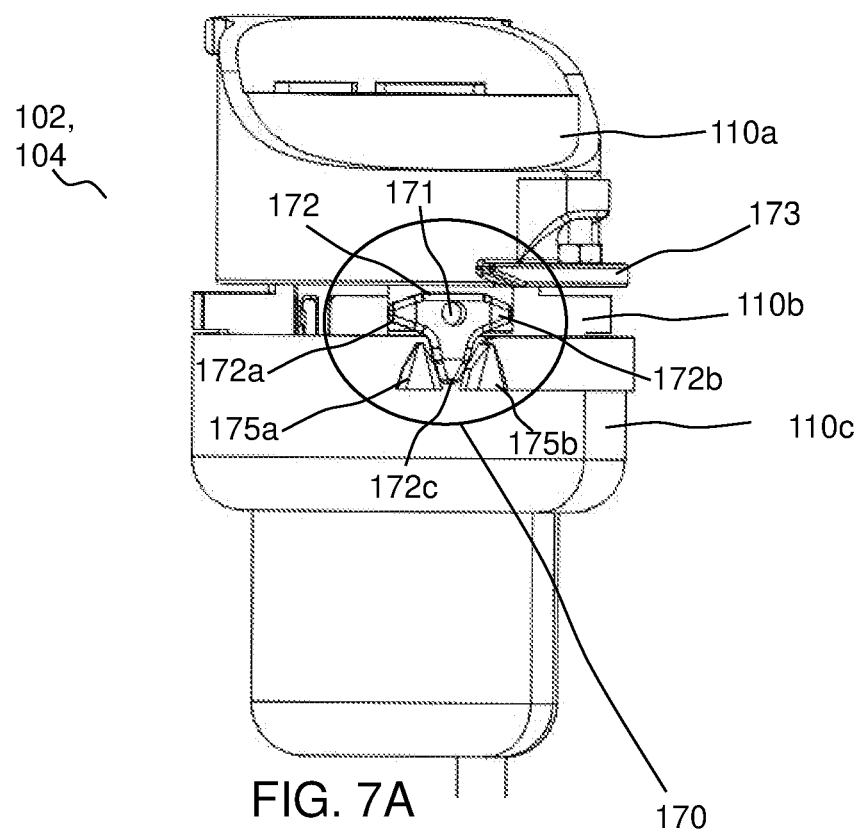
FIG. 7A shows a side view of the connector housing of each of the pair of first and second connector components with an anti-rotation mechanism in a locked position for locking the second part and the third part of the connector housing from relative rotation according to various embodiments.
Figure 7B:
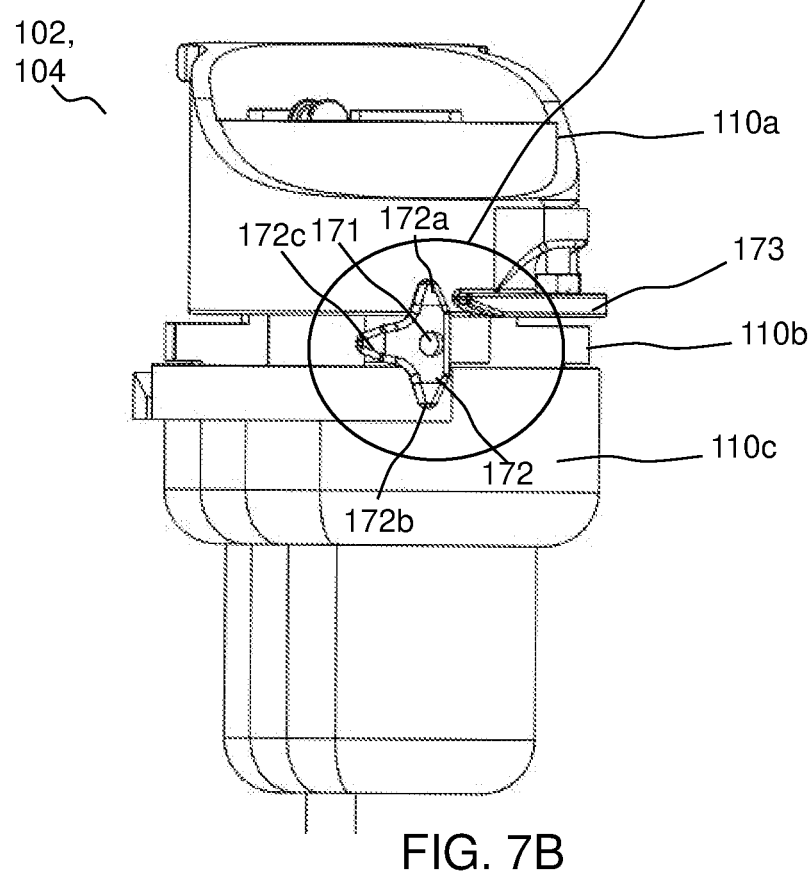
FIG. 7B shows a side view of the connector housing of FIG. 7A with the anti-rotation mechanism in an unlocked position for unlocking the second part and the third part of the connector housing to allow relative rotation according to various embodiments.

FIG. 7A shows a side view of the connector housing 110 with an anti-rotation mechanism 170 in a locked position for locking the second part 110b and the third part 110c from relative rotation according to various embodiments. FIG. 7B shows a side view of the connector housing 110 with the anti-rotation mechanism 170 in an unlocked position for unlocking the second part 110b and the third part 110c to allow relative rotation according to various embodiments.

According to various embodiments, each of the pair of first and second connector component 102, 104 may include the anti-rotation mechanism 170. According to various embodiments, the anti-rotation mechanism 170 may be operably connected between the first part 110a, the second part 110b and the third part 110c of the connector housing 110 to lock the second part 110b and the third part 110c when the second part 110b is yet to be fully rotated relative to the first part 110a to move the door 116 to the opened position, and to unlock the second part 110b and the third part 110c for relative rotation when the second part 110b is fully rotated relative to the first part 110a to move the door 116 to the fully opened position. When the second part 110b is yet to be fully rotated relative to the first part 110a, the door 116 may be at the closed position, or may only be partially open. Accordingly, the anti-rotation mechanism 170 may be connected in a manner so as to be capable of interacting with the first part 110a, the second part 110b and the third part 110c of the connector housing 110 such that the anti-rotation mechanism 170 may be obstructed or impeded or blocked from unlocking when the first part 110a and the second part 110b of the connector housing 110 are not fully rotated relative to each other and the anti-rotation mechanism 170 may concurrently obstruct or impede or block relative rotation between the second part 110b and the third part 110c of the connector housing 110. Further, when the second part 110b is fully rotated relative to the first part 110a (i.e. the door 116 is fully opened), the first part 110a and the second part 110b of the connector housing 110 may no longer obstruct or impede or block the anti-rotation mechanism 170 from unlocking and the anti-rotation mechanism 170 may be unlocked to allow relative rotation between the second part 110b and the third part 110c.

According to various embodiments, the anti-rotation mechanism 170 may be disposed at the second part 110b of the connector housing 110. The anti-rotation mechanism 170 may be operably connected to the first part 110a and the third part 110b of the connector housing 110 in a manner so as to prevent the second part 110b and the third part 110c of the connector housing 110 from relative rotation when the first part 110a and the second part 110b of the connector housing 110 are yet to be in a relative disposition whereby the door 116 is in the opened position. For example, when the first part 110a and the second part 110b of the connector housing 110 are in a relative disposition whereby the door 116 is in the closed position or in any of the relative disposition whereby the door 116 is not fully opened (or not fully reached the opened position), the anti-rotation mechanism may be prevented from unlocking and, thus, may lock the second part 110b and the third part 110c of the connector housing 110 from relative rotation. Further, the anti-rotation mechanism 170 may allow the second part 110b and the third part 110c of the connector housing 110 to rotate relative to each other when the first part 110a and the second part 110b of the connector housing 110 are in the relative disposition whereby the door 116 is in the opened position. Accordingly, when the first part 110a and the second part 110b of the connector housing 110 are in the relative disposition whereby the door is in the opened position, the anti-rotation mechanism 170 may be unlocked to allow relative rotation between the second part 110b and the third part 110c of the connector housing 110.

According to an example embodiment, the anti-rotation mechanism 170 may include a rotatable T-pin 172 disposed at the second part 110b of the connector housing 110. The T-pin 172 may be rotatable about its centre 171. The T-pin 172 may include two oppositely extending branches 172a, 172b and a stem 172c extending perpendicularly from between the two branches 172a, 172b. The first part 110a of the connector housing 110 may include an overhang element 173 extending along a segment of a circumference of the first part 110a of the connector housing 110. The third part 110c of the connector housing 110 may include a pair of blocking elements 175a, 175b. Referring to FIG. 7A, when the T-pin 172 of the second part 110b of the connector housing 110 is in the locked position, the stem 172c of the T-pin 172 may be between the pair of blocking elements 175a, 175b of the third part 110c of the connector housing 110. Further, when the first part 110a and the second part 110b of the connector housing 110 are yet to be fully rotated relative to each other such that the door 116 is fully in the opened position, the overhang element 173 of the first part 110a of the connector housing 110 may be abutting a flat side of the two branches 172a, 172b of the T-pin 172 (i.e. the side opposite the stem 172c of the T-pin 172). Accordingly, the overhang element 173 of the first part 110a of the connector housing 110 may obstruct or impede or block the T-pin 172 from rotating about its centre so as to maintain the T-pin 172 in the locked position. With the T-pin 172 in the locked position between the the pair of blocking elements 175a, 175b of the third part 110c of the connector housing 110, the second part 110b and the third part 110c of the connector housing 110 may be locked and prevented from relative rotation with each other. When the first part 110a and the second part 110b of the connector housing 110 are fully rotated relative to each other such that the door 116 is fully in the opened position, the T-pin 172 may be at a terminal end of the overhang element 173 of the first part 110a of the connector housing 110 (e.g. as shown in FIG. 7A and FIG. 7B). Accordingly, the T-pin 172 may be rotated from the locked position as shown in FIG. 7A to the unlocked position as shown in FIG. 7B. In the unlocked position, the stem 172c of the T-pin 172 may be between the pair of blocking elements 175a, 175b of the third part 110c of the connector housing 110. Hence, the T-pin 172 may no longer obstruct or impede or block the relative rotation between the second part 110b and the third part 110c of the connector housing 110. Thus, the second part 110b and the third part 110c of the connector housing 110 may be free to rotate relative to each other when the T-pin 172 is in the unlocked position as shown in FIG. 7B.

According to various embodiments, each of the pair of first and second connector components 102, 104 may include the anti-rotation lock 160 and the anti-rotation mechanism 170 to serve as safety features to prevent accidental opening of the door 116 as well as accidental movement of the connector assembly 120, so as to avoid contamination of the aseptic conditions of the first environment and the second environment within the connector housing 110 of each of the pair of first and second connector components 102, 104.

According to various embodiments, each of the pair of first and second connector components 102, 104 (or the multiple-use aseptic connector) may include several parts put together to create two layers of re-sealable aseptic barrier. According to various embodiments, each of the pair of first and second connector components 102, 104 may include the connector housing 110 made up of the first part 110a (e.g. an outer cylinder), the second part 110b (e.g. a first rotator), and a third part 110c (e.g. a second rotator); the connector assembly 120 (e.g. an inner connection mechanism); and the rotary-to-linear motion converter mechanism 140 (e.g. an extension mechanism and inner rotator).

Various embodiments may provide a two-barrier system to maintain an aseptic volume within each of the pair of first and second connector components 102, 104. The first barrier may be the door 116 with gasket and may be opened by rotation of the second part 110b (e.g. the first rotator) of the connector housing 110. The second barrier may be the valve unit 126 (e.g. the bite valve) of the connector assembly 120 and may be opened by rotation of the third part 110c (e.g. the second rotator). The valve units 126 of the connector assemblies 120 of the pair of first and second connector components 102, 104 may be opened when the the connector assemblies 120 of the pair of first and second connector components 102, 104 push against each other. The valve unit 126 (e.g. the bite valve) of the connector assembly 120 may provide a drip-free connection.

Referring to the three-step connection process for the pair of first and second connector components 102, 104, the state of the first and/or second barrier are described as follows. During step 1 (e.g. see FIG. 2A), when the pair of first and second connector components 102, 104 are pushing towards each other, the door 116 (i.e. the first barrier) may be closed and the connector assemblies 120 of the pair of first and second connector components 102, 104 may be disconnected with no fluid flow. During step 2 (e.g. see FIG. 2B), when the second part 110b (e.g. the first rotator) of the connector housing 110 is rotated relative to the first part 110a (e.g. an outer cylinder) of the connector housing 110, the door 116 (i.e. the first barrier) may be opened and the connector assemblies 120 of the pair of first and second connector components 102, 104 may remain disconnected with no fluid flow. During step 3 (e.g. see FIG. 2C), when the third part 110c (e.g. the second rotator) of the connector housing 110 is rotated relative the second part 110b (e.g. the first rotator) of the connector housing 110, the valve unit 126 (e.g. the bite valve) of the connector assembly 120 may be opened and the fluid path across the connector assemblies 120 of the pair of first and second connector components 102, 104 may be opened.

According to various embodiments, when the door 116 (i.e. the first barrier) is in the closed position (i.e. a closed configuration), the door 116 may be pushed against the opening 114 at the mating surface 112 of the first part 110a (e.g. the outer cylinder) of the connector housing 110, thus isolating the inside of the connector component 102, 104 from the outside (e.g. see FIG. 3). When the second part 110b (e.g. the first rotator) is rotated, the door 116 may follow a curved path in the first part 110a (e.g. the outer cylinder) of the connector housing 110 as the door opens and expose the opening 114 for the connector assembly 120 (e.g. the inner connection mechanism) to connect through.

According to various embodiments, the connector assembly 120 (e.g. the inner connection mechanism) may be based on the bite valve mechanism. However, various embodiments differ from the conventional commercially available bite valve-Luer lock connection in that the connector assembly 120 (e.g. the inner connection mechanism) of the various embodiments may be genderless. For example, see FIG. 2C for the connection between the connector assemblies 120 of the pair of first and second connector components 102, 104.

According to various embodiments, the connector assembly 120 (e.g. the inner connection mechanism) may be an assembly of three pieces as shown in FIG. 4A and FIG. 4B. When the connector assemblies 120 of the pair of first and second connector components 102, 104 meet, the engagement pieces 124 (or the outermost pieces) self-align and then push against each other. The pusher portion 124b (or a protrusion) at the back of the engagement piece 124 (or the outermost piece) then opens the valve unit 126 (or the bite valve) in the middle piece. Accordingly, the engagement piece 124 (or the outermost piece) may compress or deform the valve unit 126 (or the bite valve) to open the valve unit 126 (or the bite valve). Upon disconnection, the valve unit 126 (or the bite valve) pushes out the engagement piece 124 (or the outermost piece) and the connection is closed in a drip-free manner.

According to various embodiments, the first part 110a (e.g. the outer cylinder) of the connector housing 110 may include the alignment element 150 (e.g. the curved slope) to ensure that the pair of first and second connector components 102, 104 self-align and lock their position.

Figure 5C:
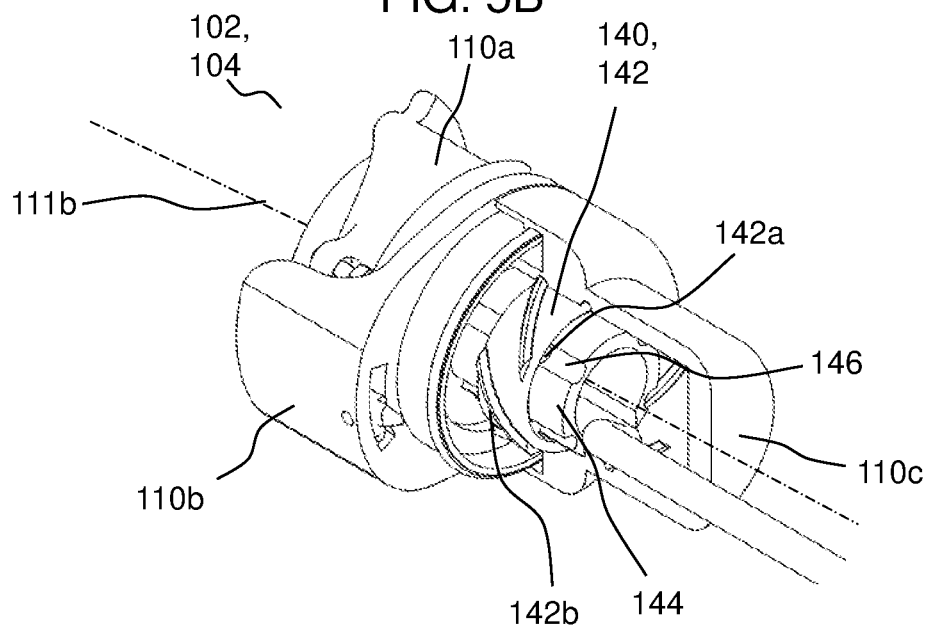
FIG. 5C shows a perspective view when the third part is being rotated relative to the second part of the connector housing of each of the pair of first and second connector components (or in the process of being rotated from FIG. 5A to FIG. 5B) with the third part partially cut away according to various embodiments.

According to various embodiments, the rotary-to-linear motion converter mechanism 140 may include the ring 142 (e.g. inner rotator) having at least one threading 142b (i.e. multi-start threads) and the at least one engagement element 142a. The at least one threading 142b (i.e. multi-start threads) may converts the rotation of the third part 110c (e.g. the second rotator) of the connector housing 110 in step 3 of the three-step connection process into linear motion of the ring 142 (e.g. inner rotator). This may move or extend the ring 142 (e.g. inner rotator) and may bring the connector assemblies 120 of the pair of first and second connector components 102, 104 together. FIG. 5A to FIG. 5C illustrates the conversion of the rotary motion to linear motion.

According to various embodiments, when each of the pair of first and second connector components 102, 104 is not connected, the connector component 102, 104 may not be opened so as to avoid compromising the aseptic barrier. In the disconnected state, the anti-rotation lock 160 (e.g. a button or the pin-head 162a of the spring-loaded pin 162) on the surface of the first part 110a (e.g. outer cylinder) of the connector housing 110 may prevent rotation of the second part 110b (e.g. the first rotator) of the connector housing 110. When the pair of first and second connector components 102, 104 are in alignment and engaged, the anti-rotation lock 160 (e.g. a button or the pin-head 162a of the spring-loaded pin 162) may be depressed and the obstruction may be removed. This may enable the second part 110b (e.g. the first rotator) of the connector housing 110 to rotate and complete the connection. 6A and FIG. 6B illustrate the obstruction mechanism. As shown the obstruction mechanism by the anti-rotation lock 160 (or button) may be such that: in the disconnected state (e.g. locked state), the anti-rotation lock 160 (or button) obstructs rotation of the second part 110b (e.g. the first rotator) of the connector housing 110; and, when depressed in the unlocked state, the anti-rotation lock 160 (or button) may allows the second part 110b (e.g. the first rotator) of the connector housing 110 to rotate.

According to various embodiments, after connection is made between the pair of first and second connector components 102, 104, the pair of first and second connector components 102, 104 may not be accidentally disconnected so as not to compromise the aseptic barrier. In step 2 of the three-step connection process, the second part 110b (e.g. the first rotator) of the connector housing 110 may be rotated to engage the other connector. As shown in FIG. 1C, during this step, the second part 110b (e.g. the first rotator) of the connector housing 110 hooks onto the first part 110a (e.g. the outer cylinder) of the connector housing 110 of the other connector, keeping both connectors engaged.

According to various embodiments, in order to simplify the connection steps, step 2 and step 3 of the three-step connection process may be consecutive rotations of the second part 110b (e.g. the first rotator) of the connector housing 110 and the third part 110c (e.g. the second rotator) of the connector housing 110 which may be made in the same direction (e.g. rotational direction) and the same motion (e.g. rotational motion). Further, since they rotate in the same direction, various embodiments have provided a fail-safe so that the rotations do not interfere with each other. As shown in FIG. 7A and FIG. 7B, the anti-rotation mechanism 170 (e.g. the T-pin 172) between t the second part 110b (e.g. the first rotator) of the connector housing 110 and the third part 110c (e.g. the second rotator) of the connector housing 110 may stop the third part 110c (e.g. the second rotator) of the connector housing 110 from rotating until the second part 110b (e.g. the first rotator) of the connector housing 110 is fully rotated. Similarly, until the third part 110c (e.g. the second rotator) of the connector housing 110 is fully retracted during disconnection, the anti-rotation mechanism 170 (e.g. the T-pin 172) may prevent the second part 110b (e.g. the first rotator) of the connector housing 110 from rotating. Thus, the rotation of the second part 110b (e.g. the first rotator) of the connector housing 110 and the third part 110c (e.g. the second rotator) of the connector housing 110 may be constrained to be sequential.

Various embodiments have provided a connector component and a connector system suitable for connecting tubes of different sizes and materials, allowing reconnection for modification during protocols, does not require to be used in a cleanroom environment (i.e. can be used in room condition), resuable multiple times (e.g. up to 6 times) with one single connector component, minimal training required for operator, suitable for small volume fluid flow (e.g. cell culture), suitable for small volume dispensing, may be integrated into complex manifold assemblies, and/or suitable to be used with tubing having diameter of approximately 3.175 mm (or 0.125 inch) for small volume transfer.

Various embodiments may be suitable of being used in: fill and finish step in bioprocessing and cell manufacturing; repeated addition and removal of materials such as cells and media, during bioprocessing and cell manufacturing; aliquoting of buffer or other liquid in bioprocessing and cell manufacturing; media and cell culture transfer, and media and buffer preparation in routine biology research; and/or liquid transfer in clinical lab processing.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:
1. A connector system comprising
a pair of connector components, each comprising
a connector housing having a mating surface, which has an opening, and a door moveable relative to the mating surface between a closed position to close the opening and an opened position to open the opening, and
a connector assembly enclosed within the connector housing and moveable relative to the connector housing towards or away from the opening at the mating surface of the connector housing along a translation axis, the connector assembly comprising
a base member having a fluid port,
an engagement piece having a contact portion directed towards the opening at the mating surface of the connector housing and a pusher portion, wherein a fluid channel extends through the engagement piece via the contact portion and the pusher portion, and
a valve unit disposed between the base member and the engagement piece, the valve unit having a resilient deformable valve member operable to control fluid flow through the valve unit between the fluid port of the base member and the fluid channel of the engagement piece, wherein the engagement piece is fitted to the valve unit with the pusher portion in abutment with the resilient deformable valve member of the valve unit and moveable relative to the base member in a manner so as to cause the pusher portion to urge open the resilient deformable valve member for enabling the fluid flow therethrough as the engagement piece is moved towards the base member under an application of a force and to cause the resilient deformable valve member to move the engagement piece away from the base member as the resilient deformable valve member returns to its original state to close the resilient deformable valve member for ceasing the fluid flow therethrough when the force is removed, wherein the pair of connector components are removably interlockable to each other with the mating surfaces thereof directed towards each other and with the openings at the mating surfaces aligned, wherein, when the pair of connector components are interlocked and the doors of the connector housings thereof are in the opened position, the connector assemblies of the pair of connector components are respectively moveable towards the openings of the mating surfaces of the pair of connector components in a manner so as to be engageable with each other through the openings at the mating surfaces to cause the engagement pieces of the pair of connector components to urge against each other such that the engagement pieces of the pair of connector components are respectively moved towards the base members thereof to urge open the resilient deformable valve members of the valve units thereof so as to establish a fluid connection through the connector assemblies of the pair of connector components between the fluid ports of the base members of the pair of connector components.

2. The connector system according to claim 1, wherein the translation axis of the connector assembly of each of the pair of connector components is perpendicular to the mating surface of the connector housing.

3. The connector system according to claim 1, wherein the resilient deformable valve member of the valve unit of the connector assembly of each of the pair of connector components immediately returns to its original state to close the resilient deformable valve member for ceasing the fluid flow therethrough when the force is removed so as to be capable of serving as a drip-free valve.

4. The connector system according to claim 1,
wherein the contact portion of the engagement piece of the connector assembly of each of the pair of connector components comprises at least one self-alignment protrusion,
wherein the self-alignment protrusions of the engagement pieces of the connector assemblies of the pair of connector components self-align with each other to align and fluidly connect the fluid channels of the engagement pieces of the pair of connector components when the connector assemblies of the pair of connector components are engaged to each other.

5. The connector system according to claim 1, wherein the connector assembly of each of the pair of connector components is oriented with the engagement piece, the valve unit and the base member in sequence, wherein the base member is farthest away from the opening at the mating surface of the connector housing.

6. The connector system according to claim 5, wherein the contact portion of the engagement piece and the pusher portion of the engagement piece are on opposite sides of the engagement piece, and the fluid channel is a straight channel extending through the engagement piece via the contact portion and the pusher portion.

7. The connector system according to claim 1, wherein the connector housing of each of the pair of connector components comprises
a first part having the mating surface, the mating surface having the opening,
a second part rotatably coupled to the first part, and
a third part rotatably coupled to the second part.

8. The connector system according to claim 7, wherein each of the pair of connector components further comprises a door mechanism coupled to the door, wherein the door mechanism is operably connected to one or both of the first part and the second part of the connector housing in a manner so as to move the door between the closed position and the opened position when the first part and the second part of the connector housing are rotated relative to each other about a first rotational axis.

9. The connector system according to claim 8, wherein the door mechanism of each of the pair of connector components is configured to rotate the door about the first rotational axis, and wherein the door is rotated together with the second part as the second part is rotated relative to the first part about the first rotational axis.

10. The connector system according to claim 9, wherein the door mechanism of each of the pair of connector components is further configured to simultaneously move the door inwards and away from the first part as the second part is rotated relative to the first part about the first rotational axis.

11. The connector system according to claim 10,
wherein the first rotational axis is perpendicular to the mating surface of the connector housing of each of the pair of connector components,
wherein the door mechanism of each of the pair of connector components comprises
a link arm with a first end pivotably coupled to the second part so as to be pivotable relative to the second part about a pivoting axis for pivoting the link arm inwards and away from the first part, wherein the door is fixedly attached to a second end of the link arm, and
an extension portion extending from the second end of the link arm,
wherein an inner cylindrical surface of the first part comprises a curve guide element,
wherein an engagement element at a tip of the extension portion is in engagement with the curve guide element such that relative rotation of the first part and the second part about the first rotational axis slides the engagement element at the tip of the extension portion along the curve guide element of the first part to simultaneously rotate the door about the first rotational axis and pivot the link arm to move the door inward and away from the first part, whereby an outward facing side of the door is receded inward from the mating surface of the first part and rotated about the first rotational axis in a manner so as to be free of contact with the connector housing and the connector assembly.

12. The connector system according to claim 8, wherein each of the pair of connector components further comprises a rotary-to-linear motion converter mechanism coupled to the connector assembly, wherein the rotary-to-linear motion converter mechanism is operably connected to one or both of the second part and the third part of the connector housing in a manner so as to move the connector assembly towards or away from the opening at the mating surface of the connector housing along the translation axis when the second part and the third part of the connector housing are rotated relative to each other about a second rotational axis.

13. The connector system according to claim 12,
wherein the first part of the connector housing of each of the pair of connector components comprises an alignment element configured for self-alignment of the openings at the mating surfaces of the pair of connector components when the pair of connector components are removably interlocked to each other.

14. The connector system according to claim 12,
wherein each of the pair of connector components comprises a twist lock mechanism for removably interlocking the pair of connector components to each other.

15. The connector system according to claim 12,
wherein the first part of the connector housing of each of the pair of connector components comprises an anti-rotation lock operably connected to the second part to lock the first part and the second part from relative rotation when the mating surfaces of the pair of connector components are disconnected,
wherein the anti-rotation lock of each of the pair of connector components unlocks the first part and the second part for relative rotation when the mating surfaces of the pair of connector components are abutting each other.

16. The connector system according to claim 15,
wherein the second part of the connector housing of each of the pair of connector components comprises an anti-rotation mechanism operably connected to the first part and the third part in a manner so as to prevent the second part and the third part from relative rotation when the first part and the second part are yet to be in a relative disposition whereby the door is in the opened position,
wherein the anti-rotation mechanism of each of the pair of connector components allows the second part and the third part to rotate relative to each other when the first part and the second part are in the relative disposition whereby the door is in the opened position.

17. The connector system according to claim 12, wherein the rotary-to-linear motion converter mechanism of each of the pair of connector components is configured to convert a relative rotation between the second part and the third part of the connector housing about the second rotational axis into a linear translation motion of the connector assembly along the translation axis.

18. The connector system according to claim 17,
wherein the connector assembly of each of the pair of connector components is slidably coupled to the second part so as to be slidable along the translation axis with respect to the second part,
wherein the rotary-to-linear motion converter mechanism of each of the pair of connector components is coupled to the connector assembly and operably connected to the third part,
wherein the rotary-to-linear motion converter mechanism of each of the pair of connector components converts the relative rotation between the second part and the third part of the connector housing about the second rotational axis into the linear translation motion of the connector assembly along the translation axis to slide the connector assembly along the second part.

19. The connector system according to claim 18,
wherein the translation axis is parallel to the second rotational axis,
wherein the rotary-to-linear motion converter mechanism of each of the pair of connector components comprises
a ring coupled to the base member or the valve unit of the connector assembly, the ring having at least one engagement element along a first surface of the ring and at least one threading along a second surface of the ring, the first surface and the second surface being opposite surfaces of the ring,
wherein the second part of the connector housing of each of the pair of connector components comprises an elongated portion having at least one linear guide element extending lengthwise, wherein the elongated portion of the second part is inserted through the ring with the at least one engagement element along the first surface of the ring in sliding engagement with the at least one linear guide element along the elongated portion of the second part,
wherein the third part of the connector housing of each of the pair of connector components comprises at least one complementary threading along a surface of the third part, wherein the at least one complementary threading of the third part is in engagement with the at least one threading along the second surface of the ring,
wherein relative rotation between the second part and the third part of the connector housing of each of the pair of connector components causes the at least one threading along the second surface of the ring to slide along the at least one complementary threading of the third part and the at least one engagement element along the first surface of the ring to slide along the at least one linear guide element along the elongated portion of the second part such that the ring translates along the translation axis to move the connector assembly along the translation axis.

20. A connector component comprising
a connector housing having a mating surface, which has an opening, and a door moveable relative to the mating surface between a closed position to close the opening and an opened position to open the opening, and
a connector assembly enclosed within the connector housing and moveable relative to the connector housing towards or away from the opening at the mating surface of the connector housing along a translation axis, the connector assembly comprising
a base member having a fluid port,
an engagement piece having a contact portion directed towards the opening at the mating surface of the connector housing and a pusher portion, wherein a fluid channel extends through the engagement piece via the contact portion and the pusher portion, and
a valve unit disposed between the base member and the engagement piece, the valve unit having a resilient deformable valve member operable to control fluid flow through the valve unit between the fluid port of the base member and the fluid channel of the engagement piece,
wherein the engagement piece is fitted to the valve unit with the pusher portion in abutment with the resilient deformable valve member of the valve unit and moveable relative to the base member in a manner so as to cause the pusher portion to urge open the resilient deformable valve member for enabling the fluid flow therethrough as the engagement piece is moved towards the base member under an application of a force and to cause the resilient deformable valve member to move the engagement piece away from the base member as the resilient deformable valve member returns to its original state to close the resilient deformable valve member for ceasing the fluid flow therethrough when the force is removed.

* * * * *